United States Patent
Suzuki et al.

(10) Patent No.: US 9,737,946 B2
(45) Date of Patent: Aug. 22, 2017

(54) SMALL-HOLE ELECTRICAL DISCHARGE MACHINING DEVICE

(75) Inventors: Eiji Suzuki, Hachioji (JP); Yuta Shimoda, Hachioji (JP)

(73) Assignee: ASTEC CO., LTD., Tokyo (JP)

( * ) Notice: Subject to any disclaimer, the term of this patent is extended or adjusted under 35 U.S.C. 154(b) by 348 days.

(21) Appl. No.: 13/814,874

(22) PCT Filed: Sep. 1, 2011

(86) PCT No.: PCT/JP2011/069959
§ 371 (c)(1),
(2), (4) Date: Feb. 7, 2013

(87) PCT Pub. No.: WO2013/031011
PCT Pub. Date: Mar. 7, 2013

(65) Prior Publication Data
US 2014/0144884 A1    May 29, 2014

(51) Int. Cl.
*B23K 9/00* (2006.01)
*B23H 7/00* (2006.01)
*B23H 9/14* (2006.01)
*B23H 7/36* (2006.01)
*B23H 1/10* (2006.01)
*B23H 7/26* (2006.01)

(52) U.S. Cl.
CPC .............. *B23H 9/14* (2013.01); *B23H 1/10* (2013.01); *B23H 7/265* (2013.01); *B23H 7/36* (2013.01)

(58) Field of Classification Search
CPC . B23H 1/10; B23H 1/04; B23H 7/101; B23H 7/265; B23H 7/36; B23H 9/14

USPC .............. 219/69.11, 69.17, 69.12, 69.15, 71
See application file for complete search history.

(56) References Cited

U.S. PATENT DOCUMENTS

| 3,067,358 | A | * | 12/1962 | De Maine | .................. 219/69.14 |
| 4,019,683 | A | * | 4/1977 | Asai | .................... B05B 17/0623 |
| | | | | | 239/102.2 |
| 4,547,647 | A | * | 10/1985 | Schneider | .............. B23H 7/102 |
| | | | | | 219/69.12 |
| 4,978,827 | A | | 12/1990 | Sakai | |
| 4,990,737 | A | * | 2/1991 | Obara | ...................... B23H 9/14 |
| | | | | | 219/69.11 |
| 5,073,690 | A | | 12/1991 | Corbin et al. | |
| 5,416,289 | A | * | 5/1995 | Tanaka | .................. B23H 7/265 |
| | | | | | 204/224 M |
| 5,739,497 | A | | 4/1998 | Tanaka | |
| 5,798,492 | A | * | 8/1998 | Enya et al. | ................ 219/69.14 |

(Continued)

FOREIGN PATENT DOCUMENTS

| JP | A-58-196925 | 11/1983 |
| JP | A-61-182725 | 8/1986 |

(Continued)

OTHER PUBLICATIONS

International Search Report dated Dec. 6, 2011 for International Patent Application No. PCT/JP2011/069959 (with translation).

(Continued)

*Primary Examiner* — Quang Van
*Assistant Examiner* — Cuong P Nguyen
(74) *Attorney, Agent, or Firm* — Oliff PLC

(57) ABSTRACT

It is an object to provide a small-hole electrical discharge machining device to discharge the machining debris efficiently and to drill a small hole by electrical discharge machining at a high speed.

11 Claims, 15 Drawing Sheets

(56) References Cited

U.S. PATENT DOCUMENTS

| | | | | |
|---|---|---|---|---|
| 5,972,209 A * | 10/1999 | Shih | ................................ | 210/85 |
| 6,211,480 B1 | 4/2001 | Nagata | | |
| 6,344,624 B1 * | 2/2002 | Moro et al. | ................. | 219/69.12 |
| 6,437,277 B1 * | 8/2002 | Moro | ..................... | B23H 7/101 |
| | | | | 219/69.12 |
| 6,717,094 B2 * | 4/2004 | Beaumont | ................... | 219/69.14 |
| 6,806,435 B2 * | 10/2004 | Ishiwata | ................... | B23H 1/00 |
| | | | | 219/69.2 |
| 6,833,523 B2 * | 12/2004 | Kimura | .................... | B23H 7/36 |
| | | | | 219/69.12 |
| 6,844,519 B2 * | 1/2005 | Ito | ............................... | 219/69.16 |
| 6,897,400 B1 * | 5/2005 | Yuan | ...................... | B23H 7/101 |
| | | | | 219/69.14 |
| 6,933,456 B2 * | 8/2005 | Yokomichi | .............. | B23H 1/10 |
| | | | | 219/69.14 |
| 7,518,081 B2 * | 4/2009 | Miyake et al. | .............. | 219/69.2 |
| 7,824,526 B2 * | 11/2010 | Yuan et al. | ............... | 204/224 M |
| 8,525,062 B2 * | 9/2013 | Sato et al. | .................. | 219/69.12 |
| 2003/0029843 A1 | 2/2003 | Barbulescu | | |

FOREIGN PATENT DOCUMENTS

| | | |
|---|---|---|
| JP | A-4-504084 | 7/1992 |
| JP | A-5-169322 | 7/1993 |
| JP | A-5-185326 | 7/1993 |
| JP | A-7-308824 | 11/1995 |
| JP | A-2001-287119 | 10/2001 |
| JP | A-2004-001156 | 1/2004 |
| KR | 10-1990-0009193 A | 7/1990 |
| WO | WO 90/09855 A1 | 9/1990 |

OTHER PUBLICATIONS

Translation of Dec. 6, 2011 Written Opinion issued in International Patent Application No. PCT/JP2011/069959.

May 27, 2015 Search Report issued in European Patent Application No. 118713383.3.

Apr. 8, 2016 Office Action issued in Korean Patent Application No. 10-2014-7027102.

* cited by examiner

[Fig.1]
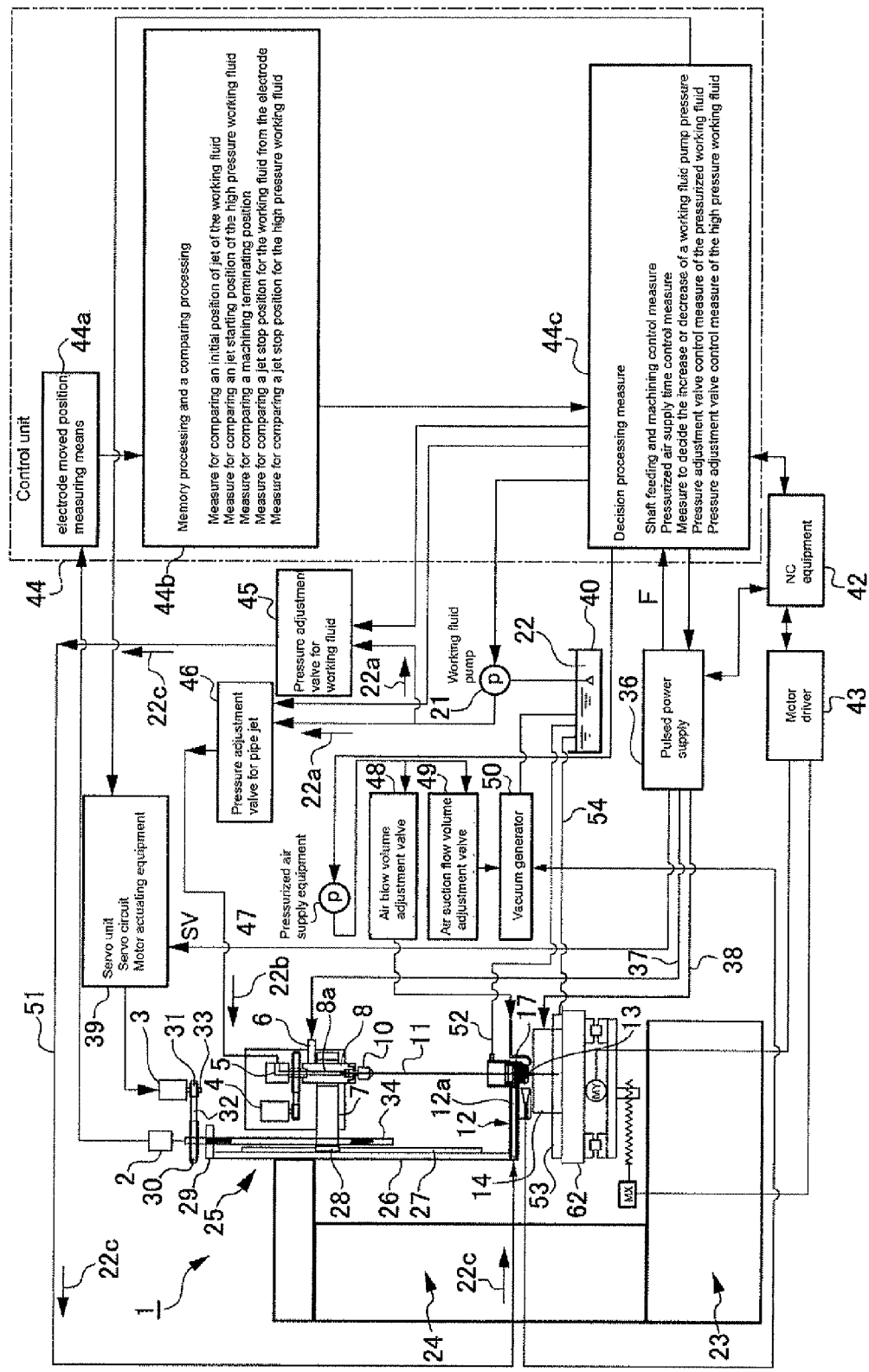

[Fig.2]
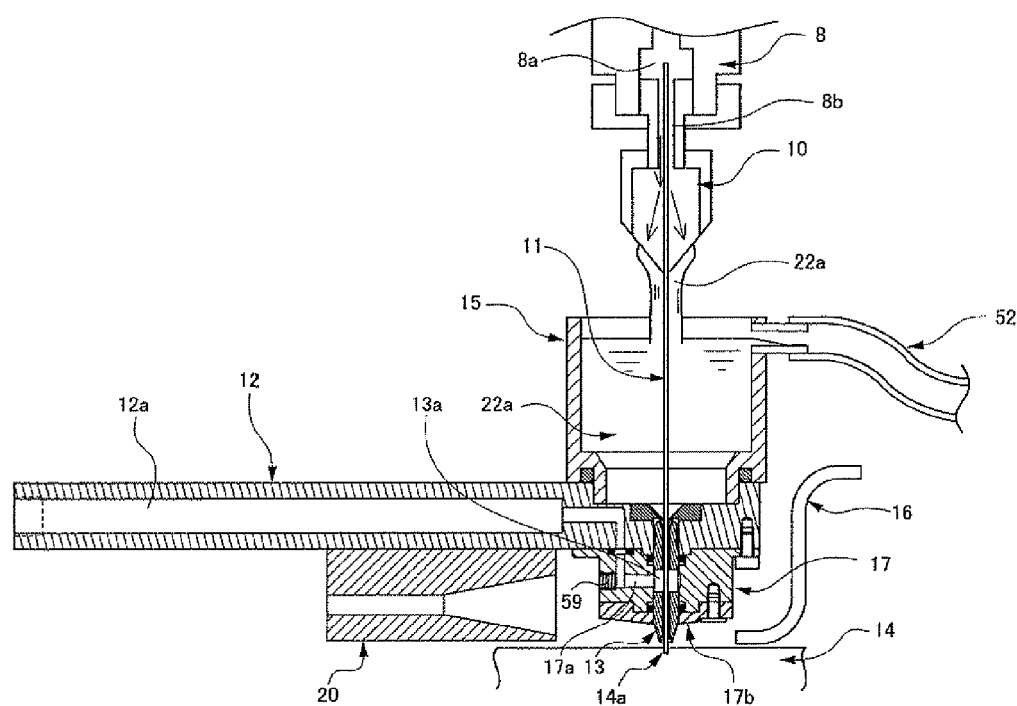

[Fig.3]
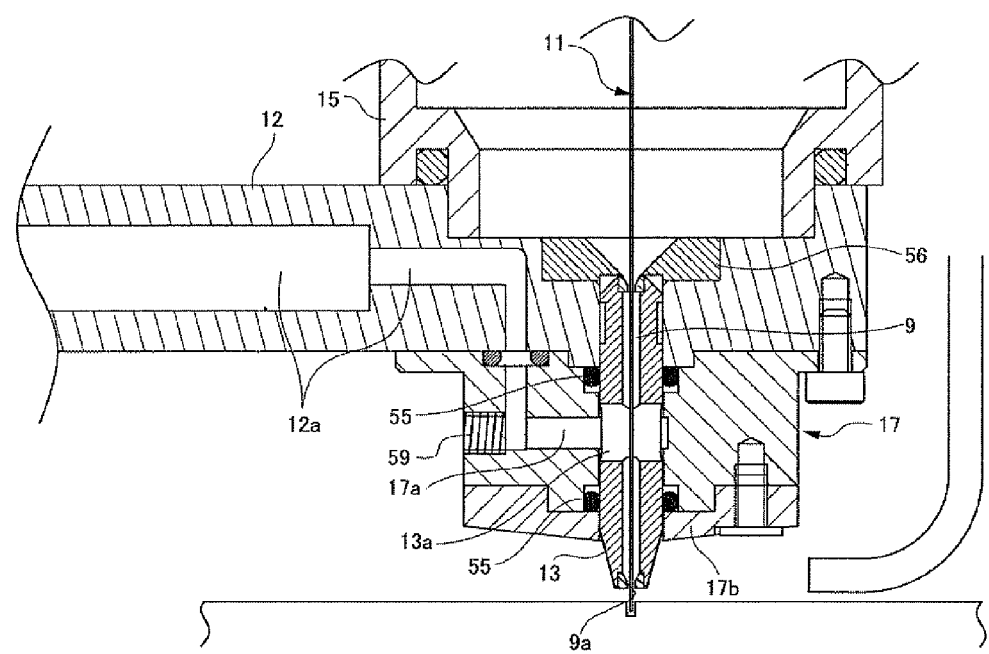

[Fig.4]
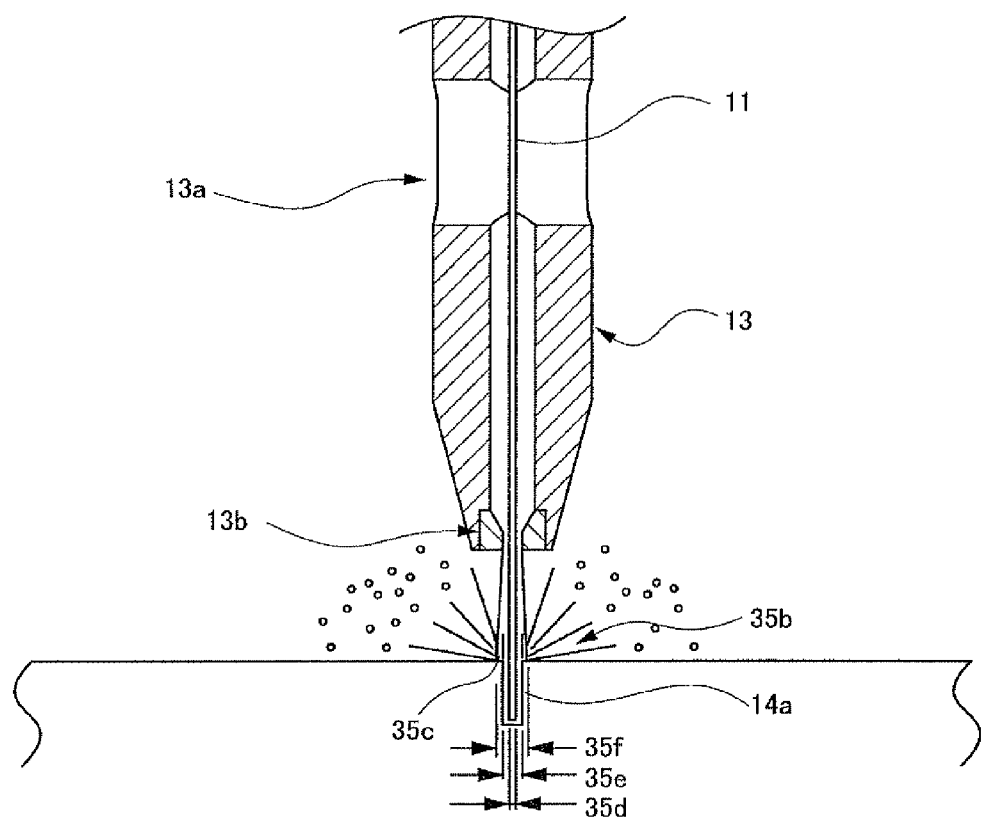

[Fig.5]
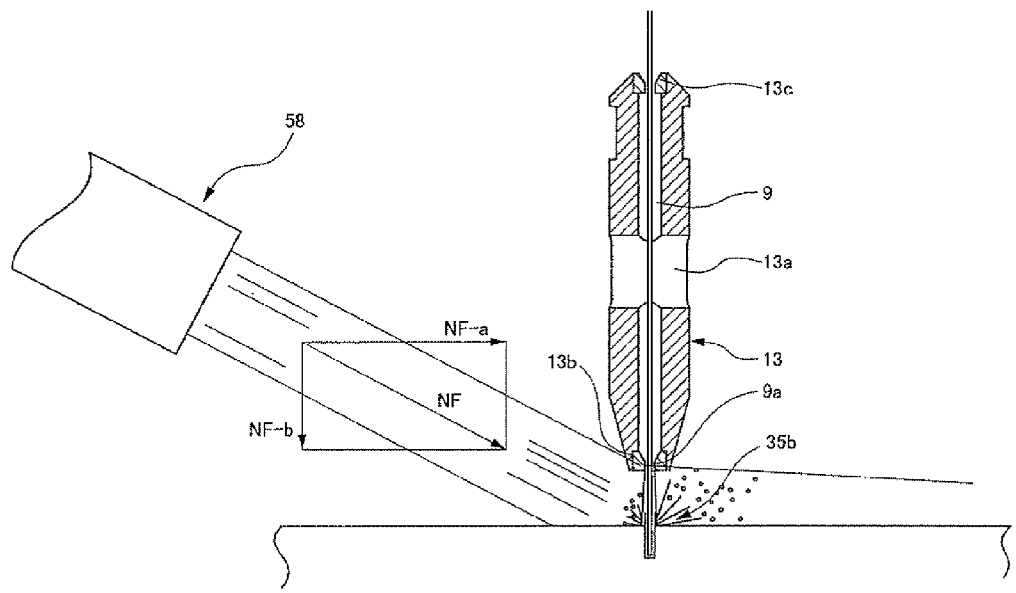
[Fig.6]
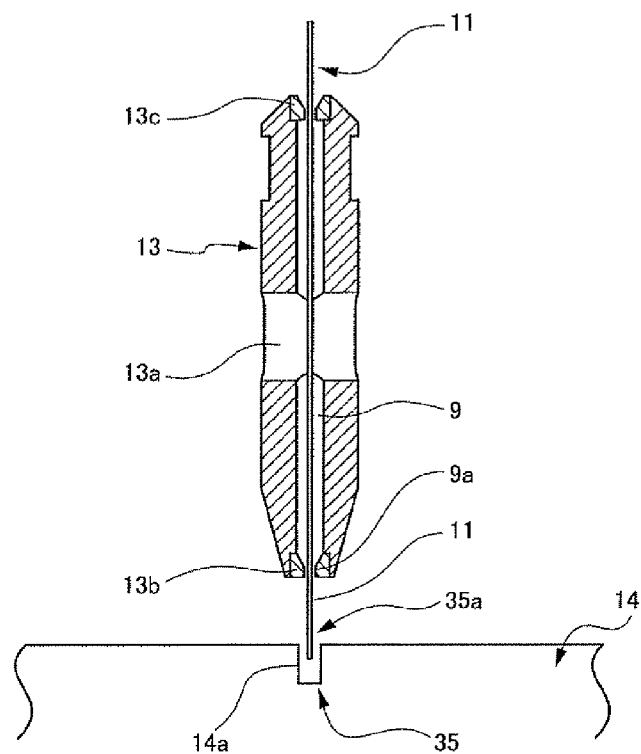

[Fig.7]
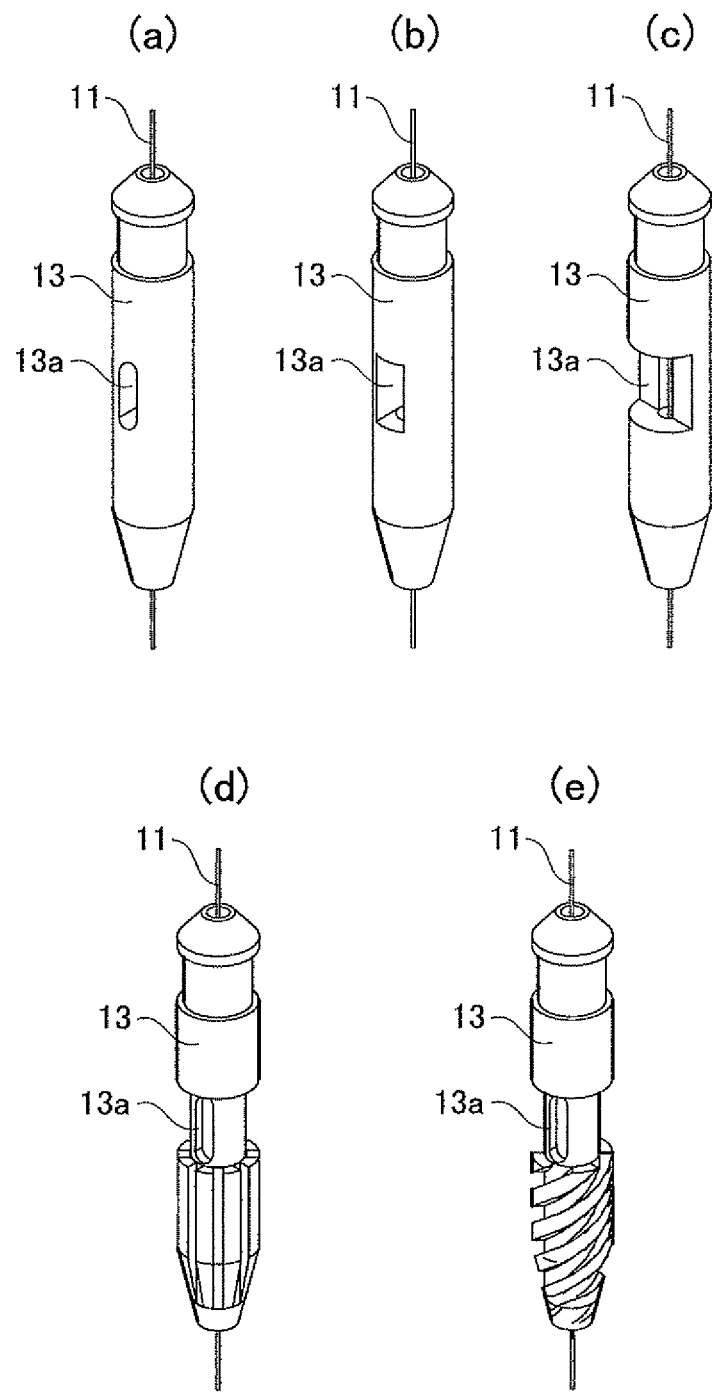

[Fig.8]
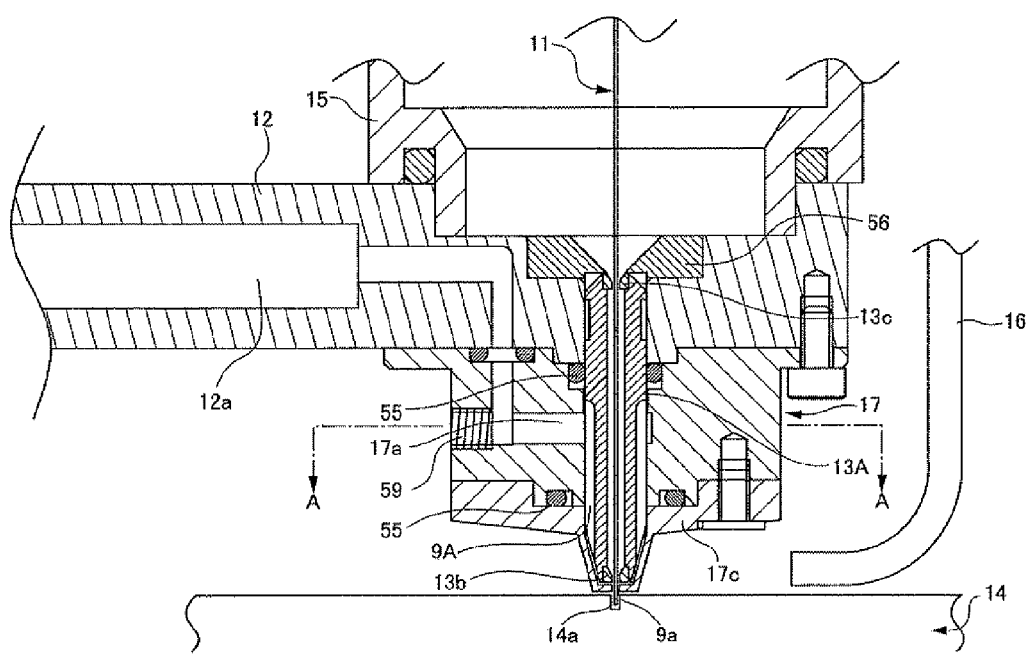

[Fig.9]
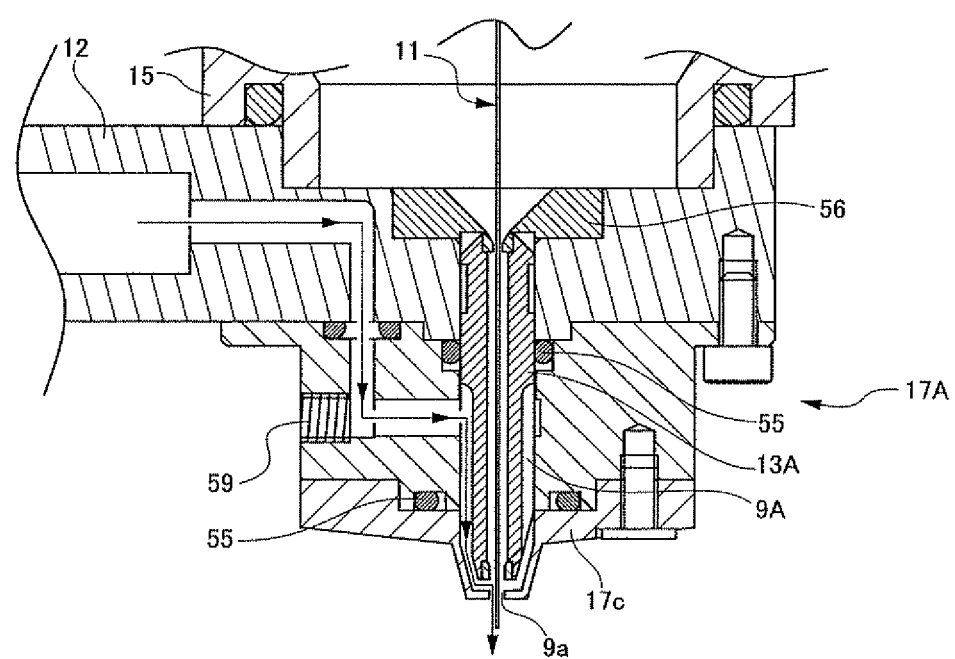

[Fig.10]
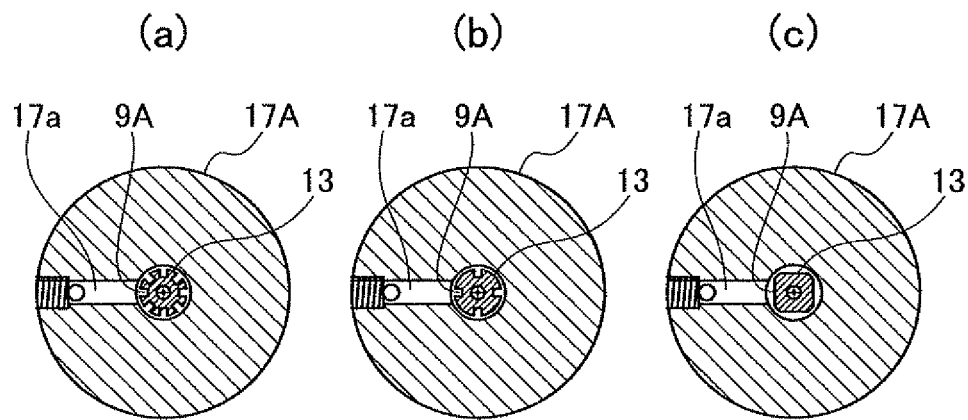
[Fig.11]
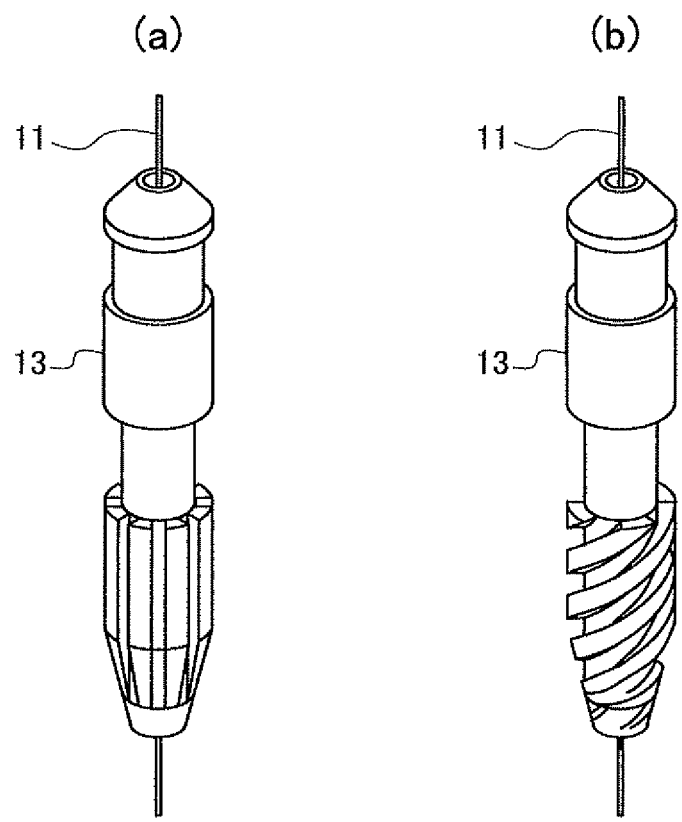

[Fig.12]
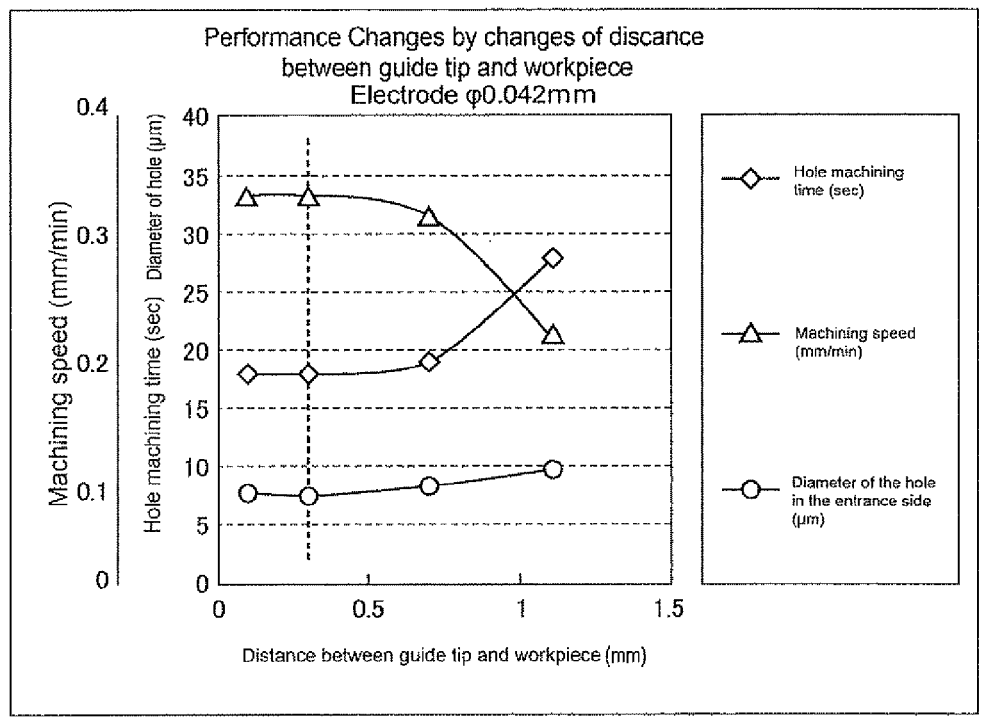
[Fig.13]
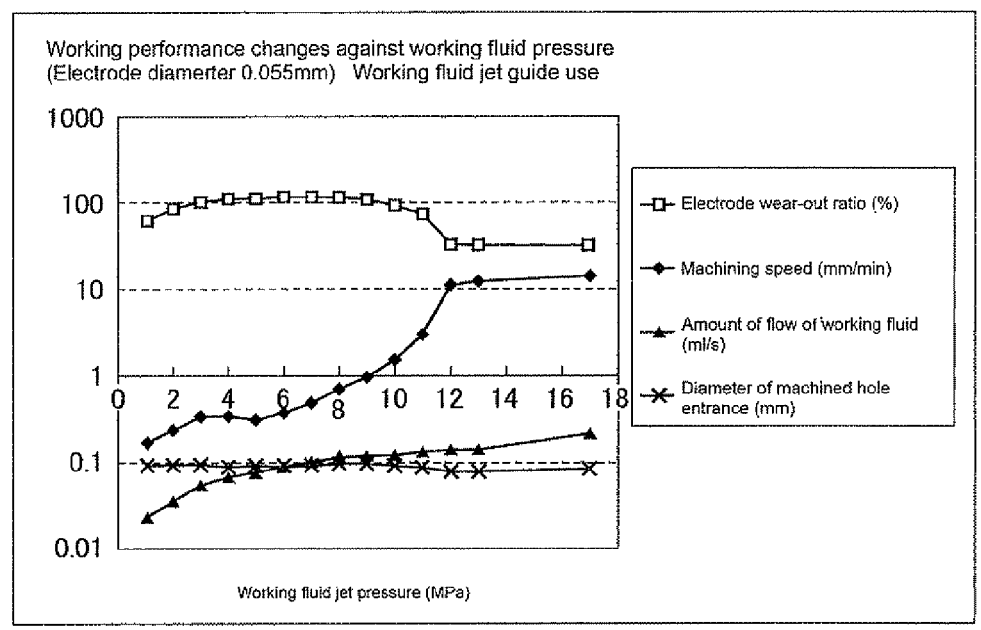

[Fig.14]
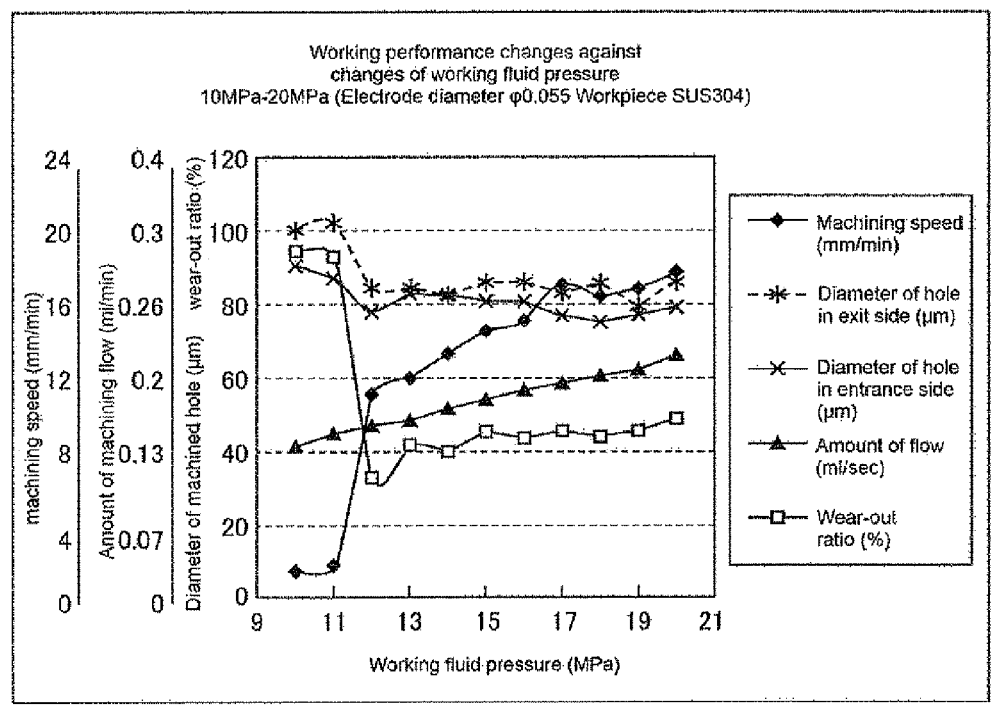

[Fig.15]
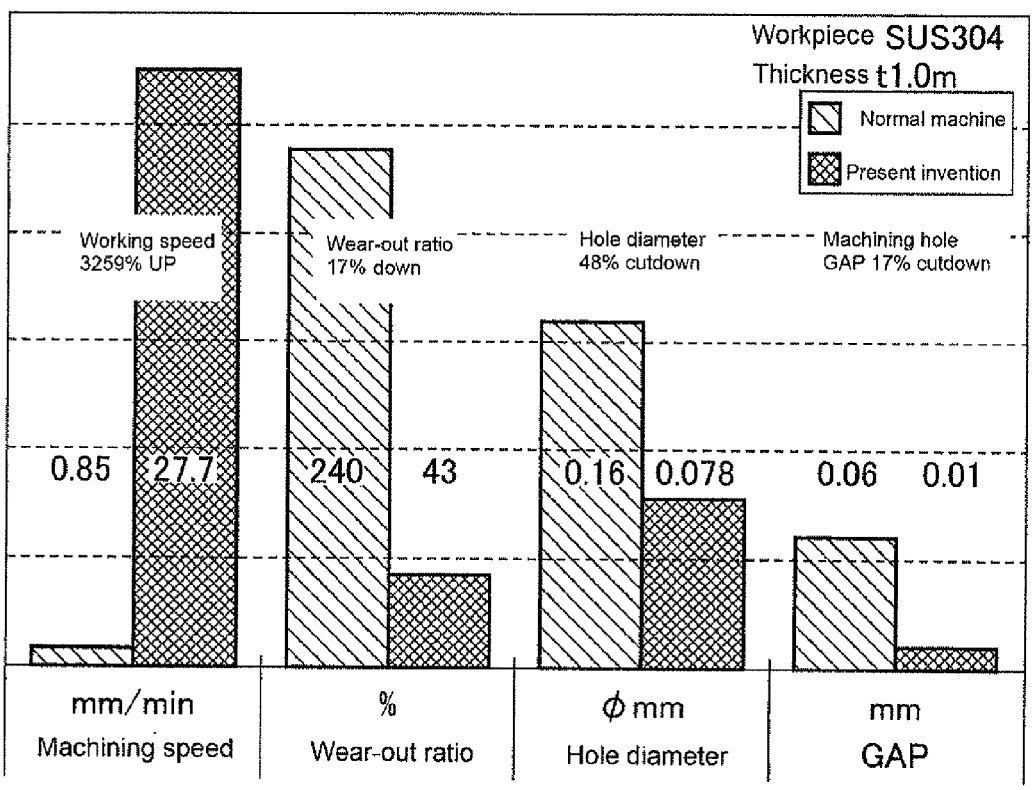

[Fig.16]
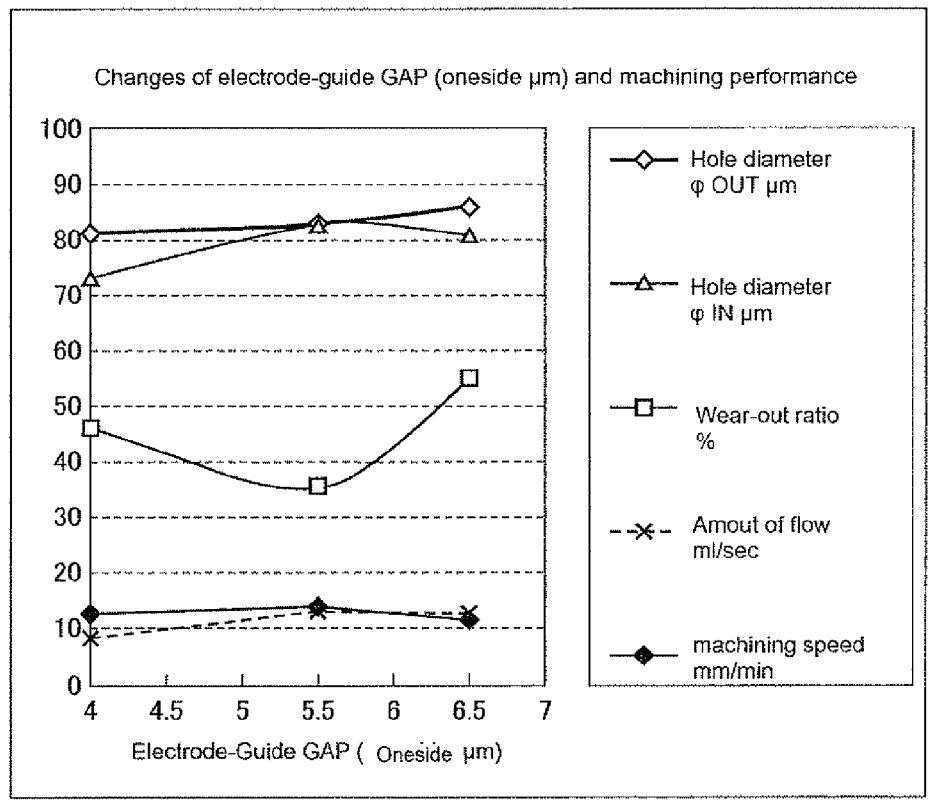
110617 Electrode-Guide GAP selection
Electrode-Guide GAP ( Oneside μm )
| Oneside μm | Machining speed mm/min | Wear-out ratio % | Hole diameter φ IN μm | Hole diameter φ OUT μm | GAP ml/sec |
|---|---|---|---|---|---|
| 4 | 12.4 | 46 | 73.3 | 81.2 | 8.22 |
| 5.5 | 13.9 | 35.5 | 82.85 | 82.9 | 13.26 |
| 6.5 | 11.4 | 55 | 81.1 | 86.2 | 12.9 |
| Electrode diameter φ mm | Guide diameter φ mm | Actual guide diameter φ mm | Electrode-Guide GAP One side mm | Fluid pressure MPa |
|---|---|---|---|---|
| 0.055 | φ0.05+0.015 | 0.066 | 0.0040 | 17 |
| | | | 0.0055 | |
| | | | 0.0065 | |

[Fig.17]
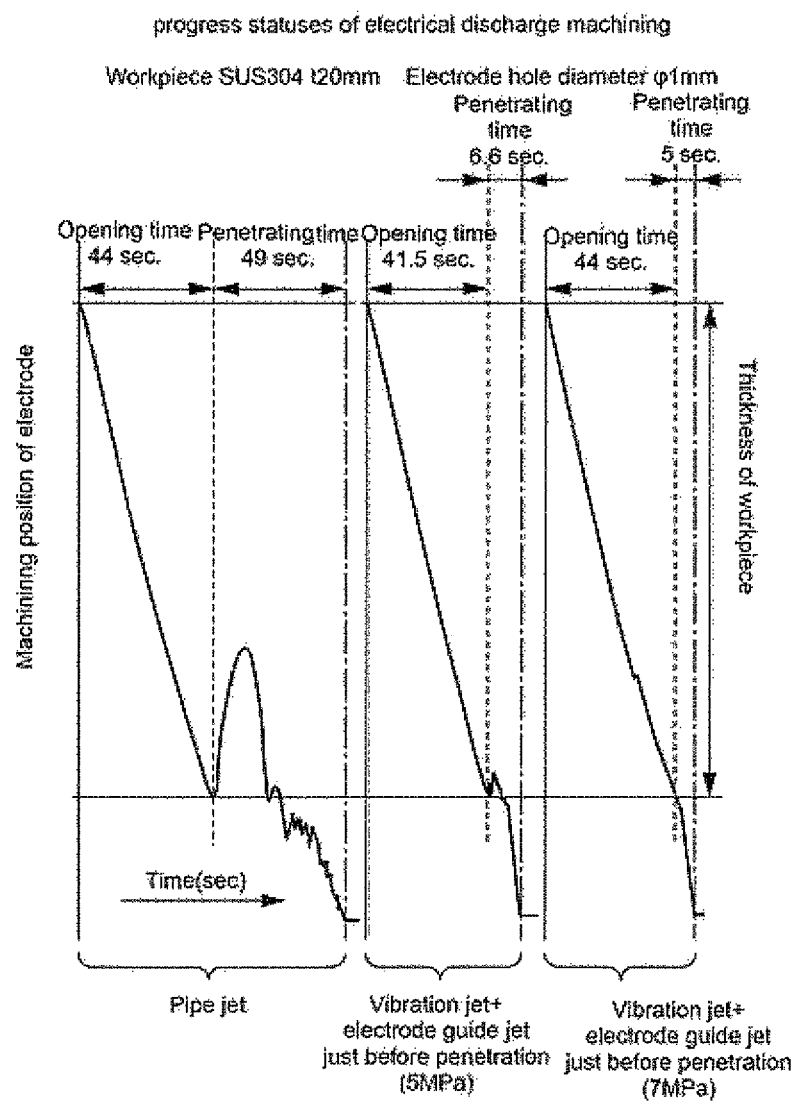

[Fig.18]
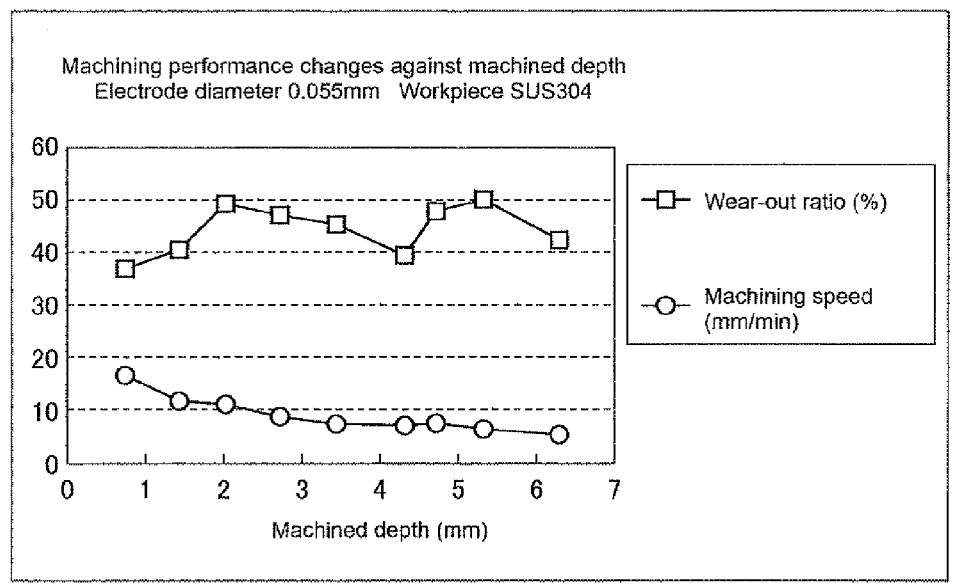

SMALL-HOLE ELECTRICAL DISCHARGE MACHINING DEVICE

TECHNICAL FIELD

The present invention relates to a small-hole electrical discharge machining device for drilling a hole or holes in a relatively small or fine diameter in such a manner as flushing working fluid thereto.

BACKGROUND ART

Recently, a small-hole electrical discharge machining device is widely used for machining such a hole or holes as an initial hole for processing to thread a wire electrode of wire-cut electrical discharge machining, a hole of a component for an aircraft or an automobile and the like, because the small-hole electrical discharge machining device achieves the faster machining speed compared to a die sinking electric discharge machining device.

The small-hole electrical discharge machining device in such a manner as flushing the working fluid, is able to produce a small hole or holes some ten times as deep as the electrode diameter(s) at a high speed by electrical discharge machining in which an stick-shaped or pipe-shaped electrode(s) are applied and pulse voltage is applied to the portion between a tip surface of the electrode-for-machining and a segment of the workpiece opposite to the electrode to repeat pulse discharge with a electrode-for-machining cooled by supplying working fluid to a machining area of a workpiece.

Pressurized working fluid applied to the machining area (the machined hole) discharges machining debris generated by the electrical discharge machining, gas and the like from the entrance of the electrical discharge machined hole through an electrical discharge machining gap (the gap between a diameter of the electrode and a diameter of the hole of the workpiece).

Though the supply of the working fluid is needed for cooling the electrical discharge machining gap between the electrode and the workpiece and for promotion of discharge of the machining debris and gas and for the like, the supply of a great deal of the fluid to the electrical discharge gap is very difficult when machining a narrow and deep hole. Therefore, conventionally, supply pump pressure of the working fluid was increased and the pressurized fluid was attempted to supply, but it was difficult to supply and circulate the sufficient working fluid because the hole was narrow and deep. Furthermore, the machining debris has a tendency to be fused and accumulate as fused adhesive deposits at the corner portion of the opening in an entrance side of the machined hole As shown in FIG. 5, in the prior art, the working fluid was jetted through the pipe electrode and toward the obliquely downward electrical discharge machining area by a jet nozzle of the working fluid disposed apart from the electrode. Specifically, also in the drilling electrical discharge machining, the jet from the side by employing the jet nozzle is adopted for discharge and removal of the machining debris in a periphery of the machining area. When applying the stick-shaped electrode, the working fluid is jetted with the jet nozzle disposed obliquely upward of the electrode, but at least a half of the opening in an entrance side of the machining area of the workpiece is submerged in the jetted working fluid, discharge openings of the machined chips are normally concentrated at a part in the opposite side of the jetting direction, and secondary discharge are generated frequently with such a low machining efficiency, such a machining system has a problem that the machined hole becomes ellipsoidal shape which have a long axis along with the jetting direction of the working fluid.

Furthermore, when the jet pressure of the working fluid is increased for the purpose of improvement of the discharge performance of the machining debris, the force vector which pushes the side of the electrode increases, the electrical discharge machining becomes unstable because the electrode is moved to the jet direction of the opening and is vibrated, and the overlap of the mechanical factor and the secondary discharge phenomenon for lack of the quantity of the working fluid causes the formation of the ellipsoidal hole.

In the Patent Literature 1, the small-hole electrical discharge machining device holding an upper edge portion of a thin pipe electrode with a electrode holder which can feed to a direction of Z axis and be driven rotatively, guiding a bottom portion of the pipe electrode, performing the electrical discharge machining by rotating the pipe electrode and feeding it to the direction to Z axis while jetting the working fluid into the electrical discharge machined hole from an upper edge of the pipe electrode through the inside of the pipe electrode, and separately from the above mentioned supply of the working fluid, flushing away chips adhered on a corner portion of the opening in the entrance side of the machined hole by jetting the working fluid from the jet nozzle provided at a plurality of parts obliquely upward of the electrical discharge machined hole at a pressure of at least 2 MPa or more, and preventing the generation of the fused adhesive deposits, is proposed.

In the Patent Literature 2, the small-hole electrical discharge machining device holding the thin pipe electrode by a hollow spindle which can feed in a direction of Z axis and be driven rotatively is proposed. In the Patent Literature 2, the electrode guide guiding the bottom portion of the pipe electrode shown in Patent Literature 1 isn't disclosed. The electrical discharge machining is performed by rotating the pipe electrode and feeding it in a direction of Z axis while supplying the working fluid into the electrical discharge machined hole in a jet flow condition from the upper edge of the pipe electrode through the inside of the pipe electrode. The machining debris are discharged from the electrical discharge machining gap between the electrode and the workpiece by applying the working fluid through the inside of the pipe electrode in a jet condition into the electrical discharge machined hole so that the working fluid passed in the pipe electrode is pulsated at a frequency of 1.5 Hz or more.

In Patent Literature 3 and 4, the supply system of the pressurized working fluid in which the pressurized working fluid is supplied so as to surround the stick-shaped electrode or the pipe-shaped electrode, and in case of the pipe electrode, supplying the working fluid by way of its tubular space is also applied jointly, is adopted.

In the Patent Literature 3, the small-hole electrical discharge machining device which performs the small-hole electrical discharge machining by holding the upper edge of the stick-shaped or the pipe-shaped electrode with the electrode holder which can feed in a Z axis direction and be driven rotatively, and guiding the bottom portion of the pipe electrode with the electrode guide, supplying the pressurized working fluid from the upper edge of the electrode to the electrode holder with the circumference of the electrode surrounded, and supplying it in a jet condition from the electrode holder to the bottom edge of the electrode holder through a guide opening trough which the electrode passes arranged on the electrode holder with the circumference of the electrode surrounded, is proposed.

In the Patent Literature 4, the small-hole electrical discharge machining device which performs the small-hole electrical discharge machining by holding the upper edge of the stick-shaped or the pipe electrode with the electrode holder which can feeds in a Z axis direction and be driven rotatively, and guiding the bottom portion of the pipe electrode with the electrode guide, supplying the pressurized working fluid from the upper edge of the electrode to the electrode holder with the circumference of the electrode surrounded, getting mixed high pressure gas in the pressurized working fluid which is supplied to the electrode holder with the ejector mechanism arranged in the electrode holder, supplying the pressurized working fluid including the gas to the bottom edge of the electrode through the guide opening of the electrode guide with the circumference of the electrode surrounded, securing the workpiece in the vacuum suction box, performing the electrical discharge machining with the inside of the box vacuuming by suctioning from the bottom portion of the box with a vacuum suction apparatus, is proposed.

CITATION LIST

Patent Literature

[PATENT LITERATURE 1] Japanese Patent Laid-Open Publications No. H05-169322
[PATENT LITERATURE 2] Japanese Patent Laid-Open Publications No. H05-185326
[PATENT LITERATURE 3] Japanese Patent Laid-Open Publications No. 2001-287119
[PATENT LITERATURE 4] Japanese Patent Laid-Open Publications No. 2004-1156

SUMMARY OF INVENTION

Technical Problem

According to the art shown in the Patent Literature 1 and 2, when performing the electrical discharge machining with the pipe electrode which diameter is 0.2 mm or less, under the influence of viscosity of the working fluid and friction of the passageway, because the pressurized working fluid supplied via the passageway in the electrode is reduced, and the amount of flow in the electrical discharge machining gap between the inner surface of the machined hole and the pipe electrode decreases, therefore the discharge of the machined chips by the pressurized working fluid becomes defective. Due to the defect, secondary discharge and/or short circuit occurs, the electrical discharge machining speed becomes late drastically, and a defect which the high speed machining of the feature of this kind of the electrical discharge machining device can't be performed. Therefore when a pressure of the working fluid is increased for the purpose of increasing the amount of jet flow of the working fluid, the machining becomes impossible because the originally straight-shaped pipe is deformed and/or deflected due to the unequal wall thickness of the tube of the pipe electrode.

Furthermore, when applying the stick shaped electrode with jetting the working fluid from opening from an oblique direction toward the opening in an entrance side of the machined hole, when the diameter of the electrode is equal to or less than 0.2 mm, the discharge of the machined chips also becomes defective and the above mentioned defect also occurs similarly to in the case of the pipe-shaped electrode.

In the patent Literature 4, it is indicated that the art shown in the Patent Literature 3 has a problem that the electrode guide is clogged for intrusion of the contaminated fluids from the machining area into the electrode guide, and by which the long and stable movement of the electrode is inhibited, and the art shown in the Patent Literature 4 can attain the problem. According to the art shown in the Patent Literature 3, the high pressure working fluid $22c$ flowing down from the above electrode holder becomes less pressure by exposing to the atmosphere and enters in the funnel portion of the electrode guide, and the extrusion pressure by the working fluid accumulated in the funnel portion let the working fluid flow down from the electrode guide toward the electrical discharge machined hole. Since the working fluid without high jetting pressure covers the surface of the electrode thickly, flows down, and radiates to the electrical discharge machining hole so that the working fluid expands to larger area than the diameter of the hole, the pressurized working fluid isn't entered and supplied sufficiently to the electrical discharge machining gap and is also accumulated around the hole, and as the pressurized working fluid is as the wall inhibiting the discharge of the machining debris generated by the electrical discharge machining from the electrical discharge machining gap, the machining debris aren't discharged sufficiently. This caused to long machining time and inefficiency.

According to the art disclosed in the Patent Literature 4, because the pressurized working fluid radiated from the electrode guide toward the electrical discharge machined hole comprises high pressure gas, as the pressurized working fluid is expanded largely before reaching the machined hole, the high pressure working fluid isn't entered and supplied sufficiently to the electrical discharge machining gap, and the machining debris aren't discharged sufficiently. This caused to long machining time and inefficiency.

Furthermore, when machining the machined hole which depth is ten times larger than its diameter by applying the stick-shaped electrode which diameter is equal to or less than 0.15 mm, as appropriate, the jumping movement of the electrode is applied jointly to discharge the machining debris in conjunction with jetting the working fluid from the side by the opening by the nozzle, however the machining isn't performed while the machining gap is enlarged by the jump, as it causes reduction of machining efficiency, there is a need for the supply system which enables to reach the sufficient amount of the pressurized working fluid to the bottom portion of the hole even when the depth of the machined hole is deep.

As shown in FIG. 5, by the conventional system jetting the working fluid from one direction by applying the jet nozzle of the working fluid or flowing water from the upper portion of the electrode, as the diameter of the nozzle or the diameter of the flowing water is large, the discharge of the machining debris are difficult because the working fluid surrounding the electrode becomes the cover when discharging the working fluid, and the machining efficiency becomes lower. In particular, the conventional system jetting the working fluid by applying the jet nozzle of the working fluid jets in an intended direction between the workpiece and the electrode, but as the jetting force is split in vector directions between the force pressing to the side of the electrode and the force along the direction of downward movement of the electrode, and the part of the force vector along the direction of downward movement of the electrode goes in the machined hole, and affect the discharge of the machining debris. Therefore the discharge effect of the machining debris by the initial jetting force of the working fluid is greatly reduced.

The present invention is invented in view of the above mentioned points, and it is an object of the present invention to provide the small-hole electrical discharge machining device which enables to supply the working fluid to the electrical discharge machining area so that the machining debris is smoothly discharged from the electrical discharge machining gap by the pressurized working fluid.

Solution to Problem

In order to achieve the above mentioned object, a small-hole electrical discharge device of the present invention comprises an electrode guide guiding a lower portion of a electrode-for-machining in a Z axis direction through an interposed fluid layer of working fluid in the vicinity of a workpiece, and wherein the electrode-for-machining is a stick-shaped electrode or a pipe-shaped electrode, a high pressure working fluid acceptance chamber accepting a high pressure working fluid into a housing block securing the electrode guide in the vicinity of the workpiece, and a high pressure working fluid jet opening disposed at a lower edge of high pressure working fluid acceptance chamber and supplying a jet flow of the high pressure working fluid to a electrical discharge machining gap so that the jet flow is not expanded as much, wherein a diameter of the high pressure working fluid jet opening is regulated in such a manner that the diameter of the high pressure working fluid jet opening is slightly larger than a diameter of the electrode, and wherein the diameter of the high pressure working fluid jet opening is approximately equal to a diameter of an entrance portion of the electrical discharge machined hole produced by a electrical discharge machining.

The small-hole electrical discharge device of the above mentioned invention retains an upper portion of the stick-shaped or the pipe-shaped electrode-for-machining with the electrode holder, and the electrode guide guides the lower portion of the electrode-for-machining in the Z axis direction with the layer of the high pressure working fluid interposed in the vicinity of the workpiece. Additionally, the high pressure working fluid drawn in the high pressure working fluid acceptance chamber is jetted from the high pressure working fluid jet opening. Since the high pressure working fluid jet opening is regulated so that the diameter of its opening slightly larger than the diameter of the electrode-for-machining, and the high pressure working fluid is jetted so that the jet flow is not expanded as much and surrounds the circumferential surface of the electrode-for-machining, the high pressure working fluid is supplied to the electrical discharge machining gap deeply. Therefore, when the electrode-for-machining is fed relatively to the workpiece in the Z axis direction and the electrical discharge machining is performed, hereby the machining debris generated at the bottom portion of the electrical discharge machined hole are incorporated in the working fluid supplied deeply to the electrical discharge machining gap and are carried away from the electrical discharge machining gap to the entrance portion of the electrical discharge machined hole smoothly. As the jet flow which reaches the periphery of the entrance portion of the electrical discharge machined hole on the surface of the workpiece hits strongly on the working fluid including the machining debris and just flown from the electrical discharge machining gap to the periphery of the entrance portion of the electrical discharge machined hole, as the working fluid becomes misty and is scattered by the hit impact, puddle of the working fluid doesn't occur at the periphery of the entrance portion of the electrical discharge machined hole, hereby fused adhesive deposits are not formed at the edge of the entrance portion of the electrical discharge machined hole, and the machining debris generated at the bottom portion of the electrical discharge machined hole are discharged outside smoothly without the machining debris accumulated in the electrical discharge machining gap. Additionally, as the electrode-for-machining is cooled sufficiently, current supplied to the electrode-for-machining can be raised more than ever before drastically, the electrical discharge machining time can be shorten several times shorter than ever before, and the electrical discharge machining efficiency is raised drastically. Furthermore, at the time of finishing drilling, as the jet flow from the high pressure working fluid jet opening penetrates the electrical discharge machining gap, because the machining debris attached to the lower edge of the electrode-for-machining are carried away, the fused adhesive deposits are not formed at the lower edge of the electrode-for-machining.

Furthermore, the small-hole electrical discharge machining device comprises a shaft retaining the electrode-for-machining, a working fluid distribution chamber drawing the working fluid into the shaft and having jet opening, wherein the electrode-for-machining is passed through the working fluid distribution chamber, a fluid tank disposed above the electrode guide, accepting the pressurized working fluid and distributing the pressurized working fluid, wherein the pressurized working fluid is jetted from the jet opening of the working fluid distribution chamber and surrounds the electrode-for-machining and flows down, and wherein a passageway of the electrode-for-machining may be communicated with the fluid tank when the electrode-for-machining is a pipe-shaped electrode, and a fluid reserve tank accepting a overflowed fluid from the fluid tank through a overflowed fluid tube 52. According to this composition, the portion of the electrode-for-machining from the electrode holder to the electrode guide can be cooled with the portion surrounded by the jet flow of the high pressure working fluid, and the high pressure working fluid can be supplied to the internal space of the electrode when the electrode-for-machining is a pipe electrode. Additionally, a great amount of the high pressure working fluid can be supplied from the working fluid pump to the electrode holder, and a great amount of the jet flow of the high pressure working fluid can jet from the electrode holder with the electrode-for-machining which is a the stick-shaped electrode or the pipe-shaped electrode surrounded, and the portion of the electrode-for-machining from the electrode holder to the fluid tank is cooled sufficiently. About the electrode-for-machining, cooling the portion to perform the electrical discharge with the workpiece apart from the lower edge of the electrode also enables to flow thigh current to the electrode-for-machining.

Preferably, in the above mentioned embodiment, the working fluid in the fluid reserve tank is split so as to be the pressurized working fluid and the high pressure working fluid, and is circulated by a working fluid pump.

According to this composition, the pressurized working fluid and the high pressure working fluid can be supplied by pumping up the working fluid reserved in the fluid reserve tank with only one pump, and the pressure of the pressurized working fluid and the pressure of the high pressure working fluid may be set up after bifurcation, the pressure setting control of the working fluid and the control of the amount of flow are easily, and the circulation system of the working fluid can be simplify.

Preferably, in the above mentioned embodiment, the small-hole electrical discharge machining device further comprises a pressure setting measure setting fluid pressure of the high pressure working fluid drawn in the high pressure working fluid acceptance chamber so as to be equal to or more than 3 MPa, and setting pressure of jet flow in such a condition as surrounding the electrode-for-machining between the electrode guide and a lower edge of the electrode so as to be equal to or more than 3 MPa.

According to this composition, as the fluid pressure of the high pressure working fluid is 3 MPa or more, even in the machining step in which the electrical discharge machined hole becomes deep, the high pressure working fluid can be supplied to the electrical discharge machining gap between the inner surface of the electrical discharge machined hole and the electrode-for-machining smoothly, the machining debris generated at the bottom of the electrical discharge machined hole can be carried out. Therefore, even if the electrical discharge machined hole is deep and small, it can be machined in a short time.

Preferably, in the above mentioned embodiment, the high pressure working fluid acceptance chamber is a hollow portion of the electrode guide, and the high pressure working fluid is fed to the hollow portion through a fluid passageway arranged in the housing block holding the electrode guide with the lower edge of the electrode guide exposing, and wherein the high pressure working fluid jet opening is arranged at a lower edge of the high pressure working fluid acceptance chamber of the hollow portion of the electrode guide. According to this composition, a great amount of the high pressure working fluid can be drawn in the hollow portion of the electrode guide, the jet flow of the high pressure working fluid which is jetted from the high pressure working fluid jet opening at the lower edge of the tubular space is supplied from the high pressure working fluid jet opening having a diameter approximately equal to the diameter of the entrance portion of the electrical discharge machined hole to the electrical machining gap so that the jet flow is not expanded as much with the electrode-for-machining surrounded at the portion from the high pressure working fluid jet opening to the lower edge of the electrode. Therefore, even the electrical discharge machined hole is deep and small, it can be machined in a short time.

Preferably, in the above mentioned embodiment, the high pressure working fluid acceptance chamber is disposed in the housing block holding the electrode guide and is extended along the circumference of the electrode guide to the lower edge of the electrode guide, and wherein the high pressure working fluid jet opening is arranged in the vicinity of the lower side of the electrode guide of the high pressure working fluid acceptance chamber concentrically. According to this composition, a great amount of the high pressure working fluid can be drawn in the space of the circumference of the electrode guide, the jet flow of the high pressure working fluid jetted from the high pressure working fluid jet opening at the lower edge of the high pressure working fluid acceptance chamber is supplied to the electrical discharge machining gap so that the jet flow jetted from the high pressure working fluid jet opening which has the diameter approximately equal to the diameter of the entrance portion of the electrical discharge machined hole and the jet flow isn't expanded as much. Therefore, even if the electrical discharge machined hole is deep and small, it can be machined in a short time.

Preferably, in the above mentioned embodiment, the small-hole electrical discharge machining device further comprises an air nozzle jetting air or inactive gas for blowing away misty scattered working fluid and/or a liquefaction segment including machining debris generated before and/or after machining, and a jetted working fluid recovery equipment for recovering the scattered working fluid and/or the liquefaction segment blown away.

According to this embodiment, the misty spattered working fluid and the liquefied segment including the machining debris is not interrupted, the working fluid including the machining debris is discharged from the electrical discharge machining gap smoothly, and it prevents forming the fused adhesive deposit at the edge of the entrance portion of the electrical discharge machined hole.

Advantageous Effects of Invention

According to the present invention, it enables to provide the small-hole electrical discharge machining device in which high pressure working fluid can be supplied at close range to the workpiece, to a electrical discharge machining gap deeply and in large amounts along the circumference of the electrode, by reducing the supply to the periphery of the entrance potion of the electrical discharge machined hole on the surface of the workpiece, by which the machining debris generated by the electrical discharge machining at the bottom portion of the electrical discharge machined hole can be discharged smoothly from the electrical discharge machining gap. Therefore, even when drilling a hole or holes having a comparatively small or fine diameter under atmospheric working conditions by electrical discharge machining at high speed, the machining debris can be discharged from the electrical discharge machining gap smoothly, and it enables to perform the stable electrical discharge machining at extremely high speed and to shorten the machining time significantly, by which it enables to improve the work efficiency and to reduce costs significantly for machining of the comparatively small hole on mass production line.

BRIEF DESCRIPTION OF DRAWING

FIG. 1 A view illustrated compositions of one embodiment of the small-hole electrical discharge machining device of first embodiment of the present invention.

FIG. 2 An enlarged cross-sectional view of the main section of the small-hole electrical discharge machining device illustrated in FIG. 1.

FIG. 3 An enlarged cross-sectional view of the main section of the small-hole electrical discharge machining device illustrated in FIG. 1.

FIG. 4 An enlarged cross-sectional view of the main section showing jetting condition of the working fluid of the small-hole electrical discharge machining device illustrated in FIG. 1.

FIG. 5 An enlarged cross-sectional view of the main section showing jetting condition by the jet opening of working fluid at the electrical discharge machining for drilling.

FIG. 6 An enlarged cross-sectional view of the guide applied to the small-hole electrical discharge machining device of this invention as the working fluid jet guide and the electrode guide for the small-hole electrical discharge machining device.

FIG. 7 Perspective views of five embodiments of the electrode guides adopted in the small-hole electrical discharge machining device illustrated in FIG. 1.

FIG. 8 An enlarged cross-sectional view of a main section of the small-hole electrical discharge machining device of second embodiment of the present invention.

FIG. 9 A cross-sectional view showing the flow of the high pressure working fluid in the main section of the small-hole electrical discharge machining device illustrated in FIG. 8.

FIG. 10 A transverse cross sectional view of the electrode guide at the A-A section of the main section of the small-hole electrical discharge machining device illustrated in FIG. 8.

FIG. 11 Perspective views of two embodiments of the electrode guides adopted in the small-hole electrical discharge machining device illustrated in FIG. 8.

FIG. 12 A graph showing data on appropriate distance of the distance between the electrode guide and the workpiece under machining condition at low machining speed.

FIG. 13 A graph showing an experimental result relating to performance changes against working fluid jet pressure changes.

FIG. 14 A graph showing an experimental result relating to machining performance changes against working fluid pressure changes.

FIG. 15 A graph compared between the conventional normal machine and the prototype machine of the present invention.

FIG. 16 A graph showing a relationship between changes of electrode-guide GAP (one side μm) and machining performance relating to electrical discharge machining with the device of the present invention.

FIG. 17 A graph compared the progress statuses of electrical discharge machining with the conventional device and the device of the present invention.

FIG. 18 A graph showing changes of wear-out ratio against changes of machining depth by the electrical discharge machining device and changes of machining speed.

DESCRIPTION OF EMBODIMENTS

Following, the small-hole electrical discharge machining device of one embodiment of the present invention is explained by reference to the drawings.

[First Embodiment]

FIG. 1 is a view of an entire composition of a first embodiment of a small-hole discharge machining device, FIG. 2 is an enlarged cross-sectional view of main section, and FIG. 3 is a further enlarged cross-sectional view of the main section.

The small-hole electrical discharge machining device 1 of this present embodiment comprises a rotating shaft 8 arranged movably in a Z axis direction and rotatably and accepts and holds an upper portion of an electrode holder 10, the electrode holder 10 which upper portion is accepted and held by the rotating shaft 8 and holds an upper edge of an electrode-for-machining 11 which is a stick-shaped electrode or a pipe-shaped electrode as a chuck unit, an electrode guide 13 guiding a lower edge of the electrode 11 through a fluid layer of working fluid in the Z axis direction, a high pressure distribution chamber 8a arranged in the rotating shaft 8 and drawn pressurized working fluid from a working fluid pump 21 through a rotating joint 5, a fluid tank 15 arranged above a housing block 17 accepting and holding the electrode guide 13 and accepts the working fluid jetting from a jet opening 8b at a lower edge of the pressurized working fluid distribution chamber 8a and flowing down along and surrounding the electrode-for-machining 11, a high pressure fluid acceptance chamber 9 in housing block 17 being communicated with the fluid tank 15 and accepting the high pressure working fluid 22c from the working fluid pump 21, and a high pressure working fluid jet opening 9a arranged at an lower edge of the high pressure working fluid acceptance chamber 9 and supplying jet flow of the high pressure working fluid 22c to an electrical discharge machining gap so that the jet flow of the high pressure working fluid having a diameter which is approximately equal to a diameter 35a of an entrance portion of the electrical discharge machined hole arranged in a workpiece 14 by the small-hole electrical discharge machining doesn't become expanded as much. Herein as the rotating shaft is used as a shaft in the present embodiment, which is not bound by it, the shaft may be a non-rotating shaft.

The small-hole electrical discharge machining device 1 of this embodiment comprises, as a circulation system of the working fluid, a working fluid pump 21, a pressure adjustment valve 46 for pipe jet, a pressure adjustment valve 45 for the working fluid jet guide, a fluid reserve tank 40. The small-hole electrical discharge machining device 1 of this embodiment also comprises, as a power-supply control system, a control unit 44, a servo unit 39, a pulsed power supply 36 for machining, NC equipment 42, and a motor driver 43.

The electrode holder 10 is held by the rotating shaft 8 at a head section 25. The head section 25 is held on a protruded portion of an upper edge of a column 24 of a frame, which is composed of a base platform 23 and a column 24 vertically arranged on the base platform 23.

The head section 25 includes L-shaped frame composed of Z axis plate 26 secured to the column 24 and a guide fixed plate 12 having an edge secured to a lower edge of the Z axis plate 26, a rail 27 arranged on the Z axis plate 26, a slide 28 engaged to the rail 27 and guided to the Z axis direction (Vertical direction), and a lifting table 7 of which proximal edge is secured to the slide 28 and extended in a horizontal direction, the lifting table 7 is movable in the Z axis direction (Vertical direction).

The head section 25 comprises a driving measure which moves the lifting table 7 in the Z direction at an upper edge of the Z axis plate 26. Namely, a feed screw axis 34 is attached rotatably and immovably in an axial direction to a mounting plate 29 having one edge secured to the upper edge of the Z axis plate 26 with its one edge and extending horizontally, and the feed screw axis 34 is screwed with a outrunner secured in an penetrating opening formed in the lifting table 7. Additionally, a servo motor 3 is arranged and a rotation of the servo motor 3 is transmitted to the feed screw 34 through a pulley 31 attached to a output axis 33 of the servo motor 3, a belt 32, a pulley 30 attached to the feed screw 34. Therefore, the lifting table 7 is guided along the rail 27 and moved in the Z axis direction by the servo motor 3 rotating the feed screw 34. The electrode holder 10 arranged at a lower edge of the lifting table 7 and holds the upper edge of the electrode 11 when inserting an upper edge of the electrode-for-machining 11 into the electrode holder 10 upwardly, and the electrode-for-machining 11 is rotated by the motor 4 arranged on the lifting table 7.

The workpiece 14 is positioned and secured on the X-Y movable table equipment 62 arranged on the base platform 23. The X-Y moving table 62 has a X-axis motor MX and a Y-axis motor MY actuated by driving signals from the motor driver 43 generated in conformity with signals from the NC equipment 43, the workpiece 14 is moved to position in the X-Y plane perpendicular to the direction of Z axis, and a position for drilling of the workpiece 14 can be located opposite to the electrode-for-machining 11 accurately.

When the electrode-for-machining 11 is in the vicinity of the entrance surface of workpiece 14 by descending the electrode 11 in the Z axis direction toward the surface, voltage depression of a pulse for machining occurs and an original point for machining is set. When the electrode-for-machining 11 and the workpiece 14 are positioned precisely, the electrical discharge machining can start, and when the electrode-for-machining 11 and the workpiece 14 are not positioned precisely, the electrical discharge machining starts after the positioning in X-Y plane.

When the electrode-for-machining 11 is a pipe electrode, the pressurized working fluid 22b drawn in the pressurized working fluid distribution chamber 8a supplies directly to the bottom portion of the electrical discharge machined hole 14a from a lower edge of the electrode 11 through a pipe hollow passageway. A lower portion of the pressurized working fluid distribution chamber 8a is a jet opening 8b in the vicinity of an electrode holding surface of the electrode holder 10, and the jet opening 8b is bored in a longitudinal direction, even if the electrode-for-machining 11 is either the pipe electrode or the stick-shaped electrode, the jet opening 8b makes a concentrated flow of the pressurized working fluid having a relatively large diameter at its lower edge, and the flow surrounds and cools the electrode-for-machining 11 down to the electrode guide 13. The flow of the pressurized working fluid 22b is accepted in the fluid tank 15.

The fluid tank 15 is supported by an upper surface of a protruded edge of the guide fixed plate 12, and accepts the working fluid surrounding the electrode-for-machining 11 and flowing down and jetted from the pressurized working fluid distribution chamber 8a. The fluid tank 15 is fluid communicated with the fluid reserve tank 40 arranged underneath by an overflowed fluid hose 52, and the working fluid overflows to the fluid reserve tank 40. Even if the fluid tank 15 has a requisite volume, and a large amount of the pressurized working fluid is drawn to the pressurized working fluid distribution chamber 8a and a large amount of the pressurized working fluid is also accepted to the fluid tank 1, the fluid surface level is kept constant by flowing down the overflowed fluid from the fluid tank 15 to the fluid reserve tank 40.

If an upper portion of the electrode-for-machining 11 than an upper guiding piece 13c is in a gas atmosphere, the electrode-for-machining 11 is burnt out when the electrode is applied much electrical current. Furthermore, because a jet of the high pressure working fluid 22 occurs from and above the clearance between the upper guiding piece 13c and the electrode, when a distance between the electrode holder 10 and the upper guiding piece 13c is relatively long, the electrode is vibrated and inflected. Therefore, as the fluid tank 15 is arranged, the high pressure working fluid 22c in the fluid tank 15 absorbs the jetting force of the working fluid over the guide in an upward direction, and as the fluid tank 15 is in an overflow manner, the stable electrical discharge machining can be performed at high speed by applying much electrical current to the electrode-for-machining 11 even in a gas atmosphere.

As shown in FIG. 6, the electrode guide 13 is formed so as to be a hollow body, and the high pressure working fluid acceptance chamber 9 is the hollow portion of the electrode guide 13 in this embodiment. The passageway 12a is arranged in the guide fixed plate 12 as a high pressure working fluid drawing passage so as to draw the high pressure working fluid 22c into the high pressure working fluid acceptance chamber 9 which is the hollow portion, a fluid passageway 17a is arranged in the housing block 17 secured on a bottom surface of the protruded edge of the guide fixed plate 12, a penetrated passageway 13a is arranged and is communicated with the high pressure working fluid acceptance chamber 9 which is communicated with the fluid passageway 17a and is the hollow portion in a middle of the side of the electrode guide 13. Additionally, as a lower guide piece 13b having the high pressure working fluid jet opening 9a is arranged at a lower edge of the high pressure working fluid acceptance chamber 9 which is the hollow portion of the electrode guide 13, as shown in the FIG. 3, the housing block is accepted the electrode guide 13 with the lower edge of the electrode guide 13 exposed. That is to say, a head cover 17b is exposed the lower edge portion of the electrode guide 13. Herein, the penetrated passageway 13a is a circular, rectangle, or elliptical cross-section, and has not only a role drawing the pressurized high pressure working fluid 22c, but also a role as an outlet for removal and discharge of the electrode 11 broken in the electrode guide 13 and/or the machining debris, and the penetrated passageway 13a is preferred to form as large as possible within the range which the mechanical strength of the electrode 13 permits.

As shown in FIG. 6, the high pressure working fluid acceptance chamber 9 is formed in several times larger diameter than the diameter of the electrode, and the lower guide piece 13b and the upper guide piece 13c are secured concentrically to the hollow portion, as the lower edge and the upper edge are squeezed. In this embodiment, the lower guide piece 13b holding the high pressure working fluid jet opening 9a is passed the electrode 11 therethrough, is arranged in a slightly larger diameter than the diameter of the electrode so that a clearance equal to or less than e.g. 2 µm is arranged around the electrode-for-machining 11, has an upper edge surface formed in a funnel shape, has a function guiding the electrode-for-machining 11 in the Z axis direction in such a manner that a fluid layer of the high pressure working fluid 22c is interposed in the fine clearance, and jets the high pressure working fluid 22c in the hollow portion in a downward direction with such a guiding function by the fluid layer so as to be a fine filmy jet flow surrounding the electrode-for-machining 11. Therefore, since the clearance between the opening of the lower guide piece 13b passed the electrode-for-machining 11 through and the electrode-for-machining 11 is the high pressure working fluid jet opening 9a, and the diameter of the high pressure working fluid jet opening 9a is regulated so as to be slightly larger diameter than the diameter of the electrode-for-machining 11, the small-hole electrical discharge machining device has a radiation guide function which is supplied the jet flow of the high pressure working fluid 22c having a diameter approximately equal to a diameter 35a of the entrance portion of the electrical discharge machined hole by the small-hole electrical discharge machining is supplied to the electrical discharge machining gap so that the jet flow is not expanded as much.

The upper guide piece 13c is passed the electrode-for-machining 11 through, is formed in a slightly larger diameter than the diameter of the electrode so that a clearance is arranged around the electrode-for-machining 11, has an upper edge surface arranged in a funnel shape, has a function guiding the electrode-for-machining 11 in the Z axis direction in such a manner that a fluid layer of the high pressure working fluid 22c is interposed in the fine clearance. An inner diameter of the upper guide piece 13c may as well be somewhat larger than an inner diameter of the lower guide piece 13b.

As shown in FIG. 1, the working fluid 22 in the fluid reserve tank 40 is pumped up by the working fluid pump 21 and is circulated so that the working fluid 22 bifurcates the pressurized working fluid 22b supplied to the pressurized working fluid distribution chamber 8a and the high pressure working fluid 22c supplied to the high pressure working fluid acceptance chamber 9. That is to say, the working fluid 22a supplied from the working fluid pump 21 is controlled its pressure to be the pressurized working fluid 22b by the pressure adjustment valve 46 for pipe jet, the pressurized working fluid 22b is drawn in the pressurized working fluid distribution chamber 8a in the electrode holder 10, the bifurcated flow of the working fluid 22a supplied from the working fluid pump 21 is controlled its pressure by the pressure adjustment valve 45 for the working fluid jet guide to be high pressure working fluid 22c so that its pressure becomes higher than the fluid pressure of the pressurized working fluid 22b, the high pressure working fluid 22c is drawn to the high pressure working fluid acceptance chamber 9 which is the hollow portion of the electrode guide 13. It is largely effective for supplying the high pressure working fluid 22c to the electrical discharge machining gap 35b deeply and discharging the machining debris that the fluid pressure of the high pressure working fluid 22c is equal to or more than 3 MPa, and the fluid pressure of the jet flow in such a condition that the high pressure working fluid 22c surrounds the electrode 11 from the electrode guide 13 to the lower edge of the electrode is equal to or more than 3 MPa. Therefore, the pressure adjustment valve 45 for the working fluid jet guide is set at the pressure equal to or more than 3 Mpa.

When the pressure of the high pressure working fluid 22c is equal to or more than 3 Mpa, the working fluid jet which passes through the electrode-for-machining 11 in the lower guide piece 13b gives momentum which turns the working fluid into a spray to the high pressure working fluid 22c, when the working fluid jet hits on a surface of a metallic material and the like within 10 mm in the jet direction. The fluid tank 15 is disposed above the upper guide piece 13c, into which the high pressure working fluid flows. The level of working fluid in the fluid tank 15 changes corresponding to the fluid pressure of the high pressure working fluid 22c, and is set so that a portion of the electrode-for-machining 11 from the electrode holder 10 to the upper guide piece 13c is submerged. Therefore, the small-hole electrical discharge machining device has a function preventing from electrode vibration and electrode inflection occurs when the electrode moving vertically for machining, and cooling the portion of the electrode from the electrode holder 10 to the upper guide piece 13c. In the above mentioned method for electrode cooling, the electrical discharge machining device can triplicate current in the electrode-for-machining 11 to set the machining pulse in comparison with the conventional one, and can perform the drilling electrical discharge machining at high speed.

The pressurized working fluid distribution camber 8a arranged in the electrode holder 10 jets the pressurized working fluid 22b supplied from the working fluid pump 21 toward the electrode guide 13 with the electrode 11 retained by the electrode holder 10 surrounded, and the pressurized working fluid is supplied to the inner space of the electrode when the electrode-for-machining 11 is the pipe-shaped electrode.

The high pressure acceptance chamber 9 arranged in the electrode guide 13 is accepted the pressurized working fluid of the jet flow which reaches the electrode guide 13 so that the electrode-for-machining 11 is surrounded from the electrode holder 10 to the electrode guide 13 by the jet flow, accepts the high pressure working fluid 22c of higher pressure than the pressurized working fluid through a high pressure working fluid supply channel 51, and makes the high pressure working fluid 22c into jet flow which surrounds the portion of the electrode-for-machining 11 from the electrode guide 13 to the lower edge of the electrode. The high pressure working fluid acceptance chamber 9 has the high pressure working fluid jet opening 9a which has a diameter approximately equal to the diameter 35a of the entrance portion of the electrical discharge machined hole arranged by the small-hole electrical discharge machining, and has function which the jet flow of the high pressure working fluid 22c jetted from the high pressure working fluid jet opening 9a supplied to the electrical discharge machining gap 35b so that the jet flow is not expanded as much.

The small-hole electrical discharge machining device comprises air nozzle 16 which jets air or inert gas to blow away the misty scattered working fluid and the liquefaction segment generated before and after machining including the machining debris, a jetted working fluid recovery equipment 20 for recovering the scattered working fluid and the liquefaction segment blown away by the air nozzle 16. The jetted working fluid recovery equipment 20 for recovering the scattered working fluid is secured on the lower surface of the guide fixed plate 12, and the air nozzle is secured in a similar way. The small-hole electrical discharge machining device comprises a pressurized air supply equipment 47 (e.g. air compressor), an air blow volume adjustment valve 48, an air suction flow volume adjustment valve 49, a vacuum generator 50, in order to jet the air or the inert gas from the air nozzle 16 and suctioning negative pressure suction with the jetted working fluid recovery equipment 20. In the event inert gas is jetted from the air nozzle 16, an air cylinder not shown in the drawings is provided. Moisture trapped by the vacuum generator 50 flows down to the fluid reserve tank 40. The pressurized air supply equipment 47 is controlled by control signals from a decision processing measure 44c of a control unit 44.

The pulsed power supply 36 for machining is electrically connected to the rotating shaft 8 by the conducting brush 6 through an output line 37 so that the electrode 11 is an anode and the workplace 14 is a cathode, and is electrically connected to the workpiece 14 thorough an output line 38, thereby pulse voltage for machining is applied to the electrical discharge machining gap 35b located between a lower edge surface of the electrode-for-machining 11 and a portion opposite to the electrode lower edge surface of the workplace 14. Herein, the electrode-for-machining 11 may be connected so as to reverse their polarities depending on their materials.

During the electrical discharge machining, the working fluid is jetted, the electrode-for-machining 11 is moved in the Z axis direction to the workpiece 14 by servo unit 39, and the electrical discharge machining gap 35b is kept an appropriate gap. The servo unit 39 has a servo circuit and a servo driver and inputs the pulse outputted from the pulsed power supply 36 for machining on the basis of signals from the NC equipment 42, and the servomotor 3 is controlled and driven. The displacement of the lifting table 7 moved up and down by rotary drive of the servo motor 3 is detected as the amount of pulse by a rotary encoder 2, the amount of pulse is inputted to an electrode movement position measuring means in the control unit 44, and the movement position of the electrode is constantly detected and the data is inputted or is compared to a memory processing and a comparing processing measure 44b.

The control unit 44 comprises an electrode movement position measuring means 44a, a memory processing and a comparing processing measure 44b using a microcomputer, and the decision processing measure 44c using a microcomputer.

The electrode movement position measuring means 44a detects the displacement (the displacement of the electrode) of the lifting table 7 which is moved up and down by the servo motor 3 with the rotary encoder 2, and inputs the amount of outputting pulse corresponding to the displacement, thereby the present position of the lower edge of the electrode performing the electrical discharge machining is constantly detected, and a signal of position is outputted to the memory processing and the comparing processing measure 44b.

The memory processing and a comparing processing measure 44b comprises a measure for comparing an initial position the working fluid jet which passes through the inside of the pipe-shaped electrode, a measure for comparing an jet starting position of the high pressure working fluid 22c from the high pressure working fluid opening 9a, a measure for comparing a machining terminating position, a measure for comparing a jet stop position for the working fluid from the electrode, and a measure for comparing a jet stop position for the high pressure working fluid 22c from the high pressure working fluid opening 9a, thereby necessary control signals are outputted to the decision processing measure 44c when the thresholds set up in each of the measures are equal to the signals from the electrode movement position measuring means 44a.

The decision processing measure 44c comprises a shaft feeding and machining control measure, a pressurized air supply time control measure, a measure to decide the increase or decrease of a working fluid pump pressure, a pressure adjustment valve control measure of the pressurized working fluid, and a pressure adjustment valve control measure of the high pressure working fluid 22c, thereby control signals are outputted to each of the working fluid circulation system, the pressurized air supply system and the power source control system. That is to say, the decision processing measure 44c outputs a actuation and/or stop signal for working pump 21, pressure setting up signal for the pressure adjustment valve 46 for the pipe jet and the pressure adjustment valve 45 for the working fluid jet guide, valve opening and/or closing signal, an actuation and/or stop signal for the pressurized air supply equipment 47, Z axis direction displacement indication signal for the servo unit 39, a control signal for the pulsed power supply 36, and a control signal for NC equipment 42. The decision processing measure 44c is applied necessary pulse voltage to the electrical discharge machining gap 35b, outputs a servo control signal sv in order to control the electrical discharge machining gap so as to be a necessary optimal value. The signal F indicating the status of the electrical discharge machining gap 35b is given from the pulsed power supply 36 to the control unit 44, the servo control signal sv is given to the servo motor 3, thereby a feed amount of the electrode-for-machining 11 in the Z axis direction is controlled. The pulse voltage for machining is applied from the pulsed power supply 36 to the electrical discharge machining gap 35b located between the electrode-for-machining 11 and the workpiece 14 through the output line 37,38.

During machining, the electrode-for-machining 11 is rotated by the electrode rotating motor 4, and is moved in the Z axis direction by the servo motor 3, during all that time, the tip portion of the electrode is guided by the electrode guide 13 and is retained the accurate position against the workpiece 14.

When the electrode-for-machining 11 descends in the Z axis direction to and is in the vicinity of the entrance surface of the workpiece 14, a voltage drop of the pulse for machining occurs and the original point for machining is set. Then, in NC electrical discharge machining equipment, the machining area is shifted and the electrical discharge machining can be started, or the electrical discharge machining can be directly started.

The sigh 55 is a sealing member, as which O-ring is used. The sigh 56 is the bowl-shaped block, and the 59 is a plug cap.

The above mentioned small-hole electrical discharge machining device retains the upper portion of the stick-shaped or the pipe-shaped electrode-for-machining with the electrode holder, and guides the lower portion of the electrode-for-machining in the Z axis direction in the vicinity of the workpiece 14 with the electrode guide with the layer of the high pressure working fluid 22c interposed. Then the high pressure working fluid 22c drawn in the high pressure working fluid acceptance chamber 9 is jetted from the high pressure working fluid jet opening 9a. The high pressure working fluid jet opening 9a is regulated in a slightly larger diameter than the diameter of the electrode-for-machining, and prevents the jet flow from expanding as much, and jets the high pressure working fluid 22c in such a manner that the jet flow surrounds the circumference of the electrode-for-machining, the high pressure working fluid 22c is supplied to the electrical discharge machining gap 35b deeply. Therefore, the small-hole electrical machining is performed by relatively feeding the electrode-for-machining in the Z axis direction with the electrode-for-machining rotated, hereby the machining debris which occurs at the bottom portion of the electrical discharge machined hole is taken up by the working fluid supplied the electrical discharge machining gap 35b deeply and is carried away to the entrance portion of the electrical discharge machined hole smoothly. Since the jet flow which reaches from the high pressure working fluid jet opening 9a to the periphery of the entrance portion of the electrical discharge machined hole on the surface of the workpiece, hits strongly the working fluid including the machining debris just flown out of the electrical discharge machining gap 35b to the periphery of the entrance portion of the electrical discharge machined hole, is scattered in misty condition on hit impact, because a puddle of the working fluid isn't arranged in the periphery of the entrance portion of the electrical discharge machined hole and the fused adhesive deposit isn't arranged at the edge of the entrance portion of the electrical discharge machined hole, the machining debris generated at the bottom portion of the electrical discharge machined hole doesn't accumulate in the electrical discharge machining gap 35b and is removed smoothly. Additionally, since the electrode-for-machining is cooled sufficiently, because the current supplied to the electrode-for-machining can be substantially larger than ever before, the electrical discharge machining time is shorten and is several times shorter than ever before and the electrical discharge machining efficiency is improved substantially. Furthermore, because at the point of finishing drilling, the jet flow from the high pressure working fluid jet opening 9a penetrates through the electrical discharge machining gap, the machining debris adhered at the side of the electrode is flushed away and the fused adhesive deposit isn't arranged at the lower edge of the electrode-for-machining.

As shown in FIG. 4, because the high pressure working fluid 22c is jetted from the clearance between the electrode-for-machining 11 and the lower guide piece 13b of the electrode guide 13 (one side is equal to or less than 0.01 mm in the experience) along the circumference of the electrode and with the electrode surrounded, the high pressure working fluid 22$c$ becomes the fluid flow directly getting into the machined hole. Furthermore, the discharge of the machining debris can be performed effectively because the range which is covered the periphery of the entrance portion of the machined hole with the high pressure working fluid 22$c$ jetted from the lower guide piece 13$b$ is small in the machining debris discharged, and the machining efficiency becomes good.

The working fluid jet from the lower guide piece 13$b$ of the electrode guide 13 is to jet the working fluid 22 pressurized at the pressure equal to or more than at least 3 MPa to the entrance portion of the electrical discharge machining gap 35$b$ arranged when the electrode-for-machining 11 is either the stick-shaped electrode and the pipe-shaped electrode, along the electrode outer surface so that the electrode surface is surrounded by the jet flow approximately parallel to the electrode moving direction in thickness approximately equal to or less than the expanding width of the electrical discharge machining.

In the area 35$c$ to which the jetted high pressure working fluid 22$c$ directly hits on the upper surface of the workpiece 14, the working fluid becomes thin wall of the fluid flow to be misty, the jetted working fluid is supplied to the electrical discharge machining gap from the portion in which the machining gap of the diameter 35$a$ of the entrance portion of the electrical discharge machined hole is non-uniformly expanded, is fed to the entrance portion of the electrical discharge machining gap 35$b$ with the machined chips before the workpiece is penetrated by the electrode. At this time, at the entrance portion of the electrical discharge machining gap, the working fluid with the machining debris to be discharged collides against the high pressure working fluid 22$c$ jetted from the electrode guide 13. However, according to the observation in the experimental example, the small-hole electrical discharge machining device of the present embodiment discharges extremely effectively the peripheral fluid layer compared to what the nozzle which has ever applied is set on. Therefore, the machining speed is improved substantially.

FIG. 7 ($a$) to ($e$) shows cross-sectional views of five embodiments of the electrode guides 13 adopted in the small-hole discharge machining device 1. As mentioned above by using the FIG. 6, every electrode guides 13 shown in (a) to (e) of the FIG. 7 plays not only the role of being flown the high pressure working fluid 22$c$ into the high pressure working fluid acceptance chamber 9 in which the electrode-for-machining 11 is inserted through the lower guide piece 13$b$ and the upper guide piece 13$c$ fit at the lower edge and the upper edge of the high pressure working fluid acceptance chamber 9 penetrating axially, but also the role as the removal and discharge aperture of residues like the broken electrode-for-machining 11 in the high pressure working fluid acceptance chamber 9, the machined chips and/or the like. The high pressure working fluid acceptance chamber 9 comprises the penetrated passageway 13$a$ for drawing the high pressure working fluid 22$c$. Therefore, the penetrated passageway 13$a$ is preferred to be as large as possible within the range which the mechanical strength of the electrode 13 permits. Therefore, in the electrode guide 13 shown in the FIG. 7 ($a$), the penetrated passageway 13$a$ is arranged to open so as to be a vertically long oval opening, and in the electrode guide 13 shown in the FIG. 7 ($b$), the penetrated passageway 13$a$ is arranged to open so as to be a vertically long rectangular opening, in the electrode guide 13 shown in the FIG. 7 ($c$), the vertically middle portion is removed in a U shape from the side, is semicircular remained in the transverse section and is connected to upper and lower portion. In the electrode guide 13 shown in the FIG. 7 ($d$), ($e$), the high pressure working fluid flows in contact with the outer surface of the lower portion than the penetrated passageway 13$a$ and cools the electrode guide 13. Furthermore, these shapes are applicable to electrode guides 13A in the after-mentioned second embodiment. The size of the penetrated passageway is equal to or more than 4 mm vertically. Therefore, when super steel ally material is applied to the electrode-for-machining 11, the removal of the electrode-for-machining 11 broken in a discrete length like 2 mm, 4 mm, 8 mm and the like in the high pressure working fluid acceptance chamber 9 by external stress is performed well.

[Second Embodiment]

FIG. 8 is a cross-sectional view of the main section according to the second embodiment of the small-hole electrical discharge machining device of the present invention. FIG. 9 is a cross-sectional view shown a flow of the high pressure working fluid in the main section. In this embodiment, the housing block 17A contains the electrode guide 13A in a hermetically sealed condition. In this embodiment, the high pressure working fluid acceptance chamber 9A is arranged with the portion of the electrode guide 13A from the side to the lower edge in the housing block 17A surrounded. A head cover 17$c$ seals the electrode guide 13A and has the high pressure working fluid jet opening 9$a$. The high pressure working fluid 22$c$ is drawn along the electrode guide 13A and reaches its lower edge. The high pressure working fluid jet opening 9$a$ is arranged in the vicinity of the lower side of the lower guide piece 13$b$ concentrically. The jet function of the high pressure working fluid 22$c$ of the high pressure working fluid jet opening 9$a$ in this embodiment is entirely similar to the jet function in the first embodiment. Additionally, as the other components are entirely similar to them in the first embodiment, the components in the part illustrated in the drawings are attached same signs as the signs of the corresponding components in the drawings relating to the first embodiment, and the explanations about them are omitted.

FIG. 10 is a cross-sectional view in an A-A section in FIG. 8, shows three different constitutions relating to the shapes of grooves arranged on the circumferential surface in order to flow the working fluid. The groove holds the high pressure working fluid acceptance chamber 9A.

FIG. 11($a$) shows the electrode guide 13A applied to the second embodiment of the small-hole electrical discharge machining device. The electrode guide 13 in this example has a plurality of grooves which are straight in a longitudinal direction and are apposed in a circumferential direction as the working fluid passageway on the circumferential surface, and sends the working fluid 22 to the jet opening linearly. When being applied the straight grooves, because the disturbance of the fluid flow is stabilized as a fluid sending direction is similar to the electrode moving direction, it enables to drilling in such a condition that the distance from the high pressure working fluid jet opening 9$a$ to the workpiece 14 is relatively long.

Furthermore, FIG. 11($b$) shows the other example of the electrode guide 13A. As this example of the electrode guide 13A has helical grooves on the circumferential surface of the guide, the rotating flows are given for the machining debris discharge, and the machining is stabilized even if the rotating speed of the electrode relatively low. In the electrode guide 13 of this example, the helical grooves are arranged at the angle of 45 degree. However the angles of the helical grooves are not limited to 45 degree, in accordance with the distance between the electrode guide 13A to the workpiece 14 and/or the electrode rotating speed, the electrode guide 13A having the appropriate groove angles is selected in compliance with the situation at that time. Herein, the number of the straight and helical groove or grooves may be one or more than one.

ing gap 35b is calculated by ((the radial diameter 35f of the jetted working fluid on the upper surface of the workpiece)−(the diameter 35e of the entrance portion of the electrical discharge machined hole))/2=0.0015 mm, the above mentioned jetted working fluid becomes misty at the area 35c.

Consequently, the electrical discharge machining proceeds in such a condition that the wall of the working fluid preventing the removal of the machining debris and the puddle of the working fluid doesn't occur. In the machining, the electrical discharge machining time is 3.7 second when the material of the workpiece 14 is SUS304 and the machining thickness is 1.0 mm.

Scheme 1

| | Electrode | Diameter of electrode | Diameter of guide φ | Machining time sec | Machining speed mm/min | wear-out ratio % | Diameter of hole (mm) φmm | Fluid Pressure Mpa |
|---|---|---|---|---|---|---|---|---|
| Data 1 of the present invention | Tangsten | 0.06 | 0.05 | 2.6 | 23.0 | 72 | 0.083 | 20 |
| Data 2 of the present invention | Tangsten | 0.06 | 0.05 | 3.7 | 16.2 | 45.5 | 0.079 | 18 |
| Data of the other company's product | Tangsten | 0.06 | | 21 | 2.23 | 30 | 0.076 | |

WORKPIECE: Data of teh present invention SUS304 (t = 1 mm), Data of the other company's product SCM420 (t = 0.8 mm)

EXPERIMENTAL EXAMPLE 1

When the pipe-shaped electrode was attached to the small-hole electrical discharge machining device shown in the embodiment, and the electrical discharge machining was performed to the work piece of which the material is SUS304 and the machining thickness is 1 mm, thes diameter of the machined hole became 0.075 mm and the machining time was approximately 4 second. In this data, the amount of fluid of the working fluid is 20.7 g/rain, and the amount is eighty times as much as the amount of fluid 0.254 ml/min of the jet of the working fluid 22 when applied the pipe-shaped electrode of which diameter 35d is 0.1 mm shown in FIG. 4. Though the diameters of hole and the machining thicknesses are different, the machining speed improves to be 25 times faster than ever before by comprising the electrode guide 13. Since the environment applying the working fluid jet guide is kept so that the machining debris are discharged stably. Therefore, the space between the electrode guide and the workpiece 14 isn't submerged.

EXPERIMENTAL EXAMPLE 2

When the pipe-shaped electrode was attached to the small-hole electrical discharge machining device shown in the embodiment, and the electrical discharge machining was performed to the work piece of which the material is SUS304 and the machining thickness is 1 mm, when the diameter of the electrode 35d shown in FIG. 4 is 0.055 mm and the inner diameter of the lower guide piece 13b is 0.063 mm, the high pressure working fluid 22c jetted from the lower guide piece 13b is expanded radially in the diameter 0.065 mm and reaches the workpiece 14 at a distance 0.3 mm, and the diameter of the jetted working fluid 22 on the upper surface of the workpiece is 0.082 mm as measured. At that time, the diameter of the machined hole is 0.079 mm. During the electrical discharge machining, the working fluid reaches the upper surface of the workpiece 14 directly through the electrical discharge machining gap 35b. The width in a radial direction of the electrical discharge machin- In the data compared to the machining efficiency, the machining speed of the small-hole electrical discharge machining device of the embodiments are approximately 7 times faster than the machining speed of the other company's one. If the machining condition is altered, the hole is expanded in a diameter of 0.007 mm, but can machine at ten times faster speed.

The working fluid 22 which is pressurized and jetted from the electrode guide 13 applied for the machining time is 1.7 cc, i.e. a extremely little amount of the working fluid 22 used.

A graph shown in FIG. 12 is the data to show an adequate distance between the electrode guide 13 and the workpiece 14 under the machining condition at a low machining speed, the standard distance is 0.3 mm in the working fluid jetting. During the electrical discharge machining, as the misty working fluid 22 has a tendency to becoming liquid around the machining area if the machining time is long, the working fluid 22 jetted from the electrode guide 13 and the electro discharge machining debris discharged by the jet machining is blown away from the entrance portion of the electrical discharge machining gap 35b by air jetted from the air nozzle 16 attached in the vicinity of the electrode guide 13, the jetted working fluid recovery equipment 20 recovers the liquid and misty working fluid 22 including the electrical discharge machining debris, wherein the jetted working fluid recovery equipment 20 is arranged at the portion beyond the electrode guide 13 arranged in an air jetting direction of the air nozzle 16, hereby what prevents discharging the working fluid 22 including the machining debris which should be discharged is a extremely little, and it enables to perform the stable electrical discharge machining at high speed, and to attach and to remove the workpiece 13 and the like easily under a gas atmosphere.

EXPERIMENTAL EXAMPLE 4

FIG. 13 is a graph showing the experimental result relating to the performance change against the working fluid jet pressure. FIG. 14 is a graph showing the experimental result relating to the machining performance change against the working fluid jet pressure. This experiment is that each changes of the electrode mortality ratio, the working speed and the diameter of the entrance of the machined hole is measured with altering the working fluid jet pressure (the amount of flow). In this experiment, the workpiece 14 of SUS304 and 1.0 mm in a thickness is penetrated by the electrode of 0.005 mm in a diameter. At this time, cooling the electrode above the electrode guide 13 and jetting air to the electrical machining gap are also applied. According to the experimental result, the machining performance in such a condition that the working fluid jetting pressure is around 3 MPa. For details, when the working fluid jet pressure is up to 3 MPa, the effect of the machining debris discharge by the jet flow from the electrode guide at the electrical discharge is poor, and when the working fluid jet pressure is more than 3 MPa, the wear-out ratio of the electrode stops increasing, and the machining debris are discharged effectively. When the working fluid jet pressure is more than 12 MPa, it is measured that the electrode wear-out ratio, the machining speed and the diameter of the entrance of machined hole are drastically altered. The cause that electrode wear-out ratio and the diameter of entrance of machined hole become small when the working fluid jet pressure is 12 MPa is supposed that the mechanical stress by the movement of electrode during machining is reduced because the working fluid works as lubricating liquid when the working fluid 22 passes through the guiding surface of the upper guide piece 13c and the lower guide piece 13b opposite to the electrode-for-machining 11, the friction of the slide bearing is reduced by the working fluid flow between the electrode-for-machining 11 and the upper guide piece 13c and between the electrode-for-machining 11 and the lower guide piece 13b. Hereby, it is supposed that the machining performance changes by increasing the number of the electrode rotating even if the working fluid jet pressure is low. Therefore, it is confirmed by the experiments by the inventors of the present invention that applying the electrode cooling for the electrode above the electrode guide 13 and the air jet to the electrical discharge machining gap jointly and being the fluid pressure of the high pressure working fluid 22c at a pressure of at least 3 MPa are effective for drilling the hole in relatively small or fine diameter at high speed. It is also confirmed that the small-hole electrical discharge machining can be performed when the fluid pressure of the high pressure working fluid 22c is at 20 MPa or more FIG. 15 is a graph for comparison between the conventional normal machine and the prototype machine of the present invention. The drilling electrical discharge machining is performed for the workpiece of SUS304 and 1.0 mm thickness with the electrode in a diameter of 0.055 mm, and the machining speed, the electrode wear-out ratio, the hole diameter and the GAP are compared. As shown in the graph, the working speed becomes dramatically fast, the electrode wear-out is reduced and the gap becomes small.

FIG. 16 is a graph shows the relationship between the changes of electrode-guide GAP (one side, μm) and the machining performance relating to the electrical discharge machining with the device of the present invention.

FIG. 17 is a graph for comparison the progress statuses of the electrical discharge machining of the conventional device and the device of the present invention. The drilling electrical discharge machining is performed for the workpiece of SUS304 and 20 mm thickness with the stick-shaped electrode in brass of φ1 mm, and the progress statuses are measured until it penetrated. The conventional device takes 49 seconds for penetration, while the device of the present invention takes 5 second for penetration.

FIG. 18 is a graph showing changes of the wear-out ratio against changes of the machining depth of the electrical discharge machining device and changes of the machining speed.

[The Other Embodiment]

The present invention isn't limited to the above mentioned embodiments, the technical scope interpreted based upon the statements in the scope of the claims includes a various sorts of embodiments changed their design without departing from the scope of the invention.

REFERENCE SIGN LIST 8 rotating shaft
8a pressurized working fluid distribution chamber
8b jet opening
9,9A pressurized working fluid acceptance chamber
9a pressurized working fluid jet opening
10 electrode holder
11 electrode-for-machining
13 electrode guide
14 workpiece
15 fluid tank
16 air nozzle
17,17A housing block
17a fluid passageway
20 jetted working fluid recovery equipment
21 working fluid pump
22b pressurized working fluid
22c high pressure working fluid
35a diameter of the entrance portion of electrical discharge machined hole
35b electrical discharge machining gap
40 fluid reserve tank

The invention claimed is:

1. A small-hole electrical discharge machining device, comprising:
an electrode guide formed as a hollow body and guiding a lower portion of an electrode-for-machining in a Z axis direction through an interposed fluid layer of working fluid with respect to a workpiece, wherein the electrode-for-machining is disposed in a hollow portion of the electrode guide formed as the hollow body such that the electrode-for-machining passes through upper and lower edges of the electrode guide, the electrode-for-machining comprising a stick-shaped electrode or a pipe-shaped electrode;
a housing block disposed outside the electrode guide configured to receive and support the electrode guide;
a high pressure working fluid acceptance chamber disposed in the hollow portion of the electrode guide formed as the hollow body to accept a high pressure working fluid in a space between an inner wall of the electrode guide defining the hollow portion and the electrode-for-machining; and
a high pressure working fluid jet opening disposed at a lower edge of the high pressure working fluid acceptance chamber to directly supply a jet flow of the high pressure working fluid into an electrical discharge machining gap of the workpiece therethrough, wherein the high pressure working fluid acceptance chamber has a diameter several times larger than that of the electrode-for-machining in a zone above the lower edge of the high pressure working fluid acceptance chamber and below an upper edge of the high pressure working fluid acceptance chamber, the high pressure working fluid jet opening has a reduced cross section relative to a cross section of the high pressure working fluid acceptance chamber in the zone above the lower edge of the high pressure working fluid acceptance chamber and below the upper edge of the high pressure working fluid acceptance chamber, and during an electrical discharge machining, the jet flow of the high pressure working fluid is supplied into the electrical discharge machining gap so that the jet flow surrounds a circumference of the electrode-for-machining along the electrode-for-machining.

2. The small-hole electrical discharge machining device according to claim 1, further comprising:

a shaft retaining the electrode-for-machining;

a working fluid distribution chamber feeding the working fluid into the shaft and having a jet opening, wherein the electrode-for-machining is passed through the working fluid distribution chamber;

a fluid tank disposed above the electrode guide, accepting a pressurized working fluid and distributing the pressurized working fluid, wherein the pressurized working fluid is jetted from the jet opening of the working fluid distribution chamber and surrounds the electrode-for-machining and flows down, and wherein a passageway of the electrode-for-machining may be communicated with the fluid tank when the electrode-for-machining is a pipe-shaped electrode; and a fluid reserve tank accepting an overflowed fluid from the fluid tank through an overflowed fluid tube.

3. The small-hole electrical discharge machining device according to claim 2, wherein the working fluid in the fluid reserve tank is split so as to be the pressurized working fluid and the high pressure working fluid, wherein both of the pressurized working fluid and the high pressure working fluid are circulated by a working fluid pump.

4. The small-hole electrical discharge machining device according to claim 1, further comprising a pressure setting measure setting fluid pressure of the high pressure working fluid accepted in the high pressure working fluid acceptance chamber so as to be equal to or more than 3MPa, and setting a pressure of a jet flow in such a condition as surrounding the electrode-for-machining between the electrode guide and a lower edge of the electrode so as to be equal to or more than 3MPa.

5. The small-hole electrical discharge machining device according to claim 1, wherein the high pressure working fluid is fed to the hollow portion through a fluid passageway arranged in the housing block holding the electrode guide with a lower edge of the electrode guide exposed, and wherein the high pressure working fluid jet opening is arranged at a lower edge of the high pressure working fluid acceptance chamber of the hollow portion of the electrode guide.

6. The small-hole electrical discharge machining device according to claim 1, wherein the high pressure working fluid acceptance chamber is disposed in the housing block holding the electrode guide and is extended along the circumference of the electrode guide to the lower edge of the electrode guide, and wherein the high pressure working fluid jet opening is concentrically arranged in the vicinity of the lower edge of the electrode guide and of the high pressure working fluid acceptance chamber.

7. The small-hole electrical discharge machining device according to claim 1, further comprising an air nozzle jetting air or inactive gas for blowing away misty scattered working fluid and/or a liquefaction segment including machining debris generated before and/or after machining, and a jetted working fluid recovery equipment for recovering the scattered working fluid and/or the liquefaction segment blown away.

8. The small-hole electrical discharge machining device according to claim 1, wherein a difference between a diameter of the high pressure working fluid jet opening and a diameter of the electrode-for-machining is 0.02 mm or less.

9. The small-hole electrical discharge machining device according to claim 1, wherein the upper edge of the high pressure working fluid acceptance chamber has a reduced cross section relative to the cross section of the high pressure working fluid acceptance chamber in the zone above the lower edge of the high pressure working fluid acceptance chamber and below the upper edge of the high pressure working fluid acceptance chamber.

10. The small-hole electrical discharge machining device according to claim 1, wherein due to a guide piece disposed at the lower edge of the high pressure working fluid acceptance chamber, the high pressure working fluid jet opening has the reduced cross section relative to the cross section of the high pressure working fluid acceptance chamber in the zone above the lower edge of the high pressure working fluid acceptance chamber and below the upper edge of the high pressure working fluid acceptance chamber.

11. The small-hole electrical discharge machining device according to claim 10, wherein the guide piece and the hollow portion are concentrically arranged.

* * * * *